United States Patent
Kimura

(10) Patent No.: US 10,859,374 B2
(45) Date of Patent: Dec. 8, 2020

(54) OPTICAL ANGLE SENSOR

(71) Applicant: Mitutoyo Corporation, Kanagawa (JP)

(72) Inventor: Akihide Kimura, Saitama (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/502,106

(22) Filed: Jul. 3, 2019

(65) Prior Publication Data
US 2020/0011661 A1    Jan. 9, 2020

(30) Foreign Application Priority Data

Jul. 5, 2018 (JP) .................... 2018-128542

(51) Int. Cl.
| | |
|---|---|
| G01B 11/27 | (2006.01) |
| G01D 5/38 | (2006.01) |
| G01D 5/347 | (2006.01) |
| G01B 11/24 | (2006.01) |

(52) U.S. Cl.
CPC .............. *G01B 11/27* (2013.01); *G01B 11/24* (2013.01); *G01D 5/347* (2013.01); *G01D 5/38* (2013.01)

(58) Field of Classification Search
CPC ...... G02B 11/26; G02B 17/004; G01B 11/27; G01B 11/24; G01D 5/347; G01D 5/38
USPC ....................................................... 356/138
See application file for complete search history.

(56) References Cited

U.S. PATENT DOCUMENTS

| | | | | |
|---|---|---|---|---|
| 3,232,164 A | * | 2/1966 | Kern ................. | G01D 5/30 356/141.3 |
| 3,360,324 A | * | 12/1967 | Hora .................. | G02F 1/29 359/317 |
| 3,708,231 A | * | 1/1973 | Walters ............. | G01D 5/30 356/152.1 |
| 2019/0145799 A1 | * | 5/2019 | Guggenmos ...... | G01D 5/38 250/231.14 |

FOREIGN PATENT DOCUMENTS

| | | |
|---|---|---|
| JP | 6-11362 | 1/1994 |
| JP | 2005-274429 | 10/2005 |
| JP | 2017-133892 | 8/2017 |

* cited by examiner

*Primary Examiner* — Roy M Punnoose
(74) *Attorney, Agent, or Firm* — Rankin, Hill & Clark LLP

(57) ABSTRACT

The present invention provides an optical angle sensor capable of detecting a wide range of angles with high resolution, having no scale, and specifying a reference angle. The optical angle sensor includes a light source for irradiating light, a reflection means for rotating around a predetermined axis as a measurement axis and reflecting the light irradiated from the light source, a light receiving means for receiving the light irradiated from the light source, and a calculation means for calculating the light received by the light receiving means as a signal. The light receiving means receives the light irradiated from the light source through the reflection means. The calculation means includes a specifying means for specifying the reference angle based on the light received by the light receiving means, and an angle calculating unit for calculating an absolute angle based on the light received by the light receiving means and the reference angle specified by the specifying means.

12 Claims, 13 Drawing Sheets

OPTICAL ANGLE SENSOR

CROSS-REFERENCE TO RELATED APPLICATION

This non-provisional application claims priority under 35 U.S.C. § 119(a) from Japanese Patent Application No. 2018-128542, filed on Jul. 5, 2018, the entire contents of which are incorporated herein by reference.

BACKGROUND

Technical Field

The present invention relates to an optical angle sensor.

Background Art

Conventionally, an optical angle sensor has been known which includes a light source for irradiating light, a reflection means for rotating around a predetermined axis as a measurement axis and reflecting light irradiated from the light source, a light receiving means for receiving light irradiated from the light source, and a calculation means for calculating light received by the light receiving means as a signal.

Such an optical angle sensor preferably can detect angles with high resolution, is capable of detecting a wide range of angles of 1 degree or more, has no scale, and is capable of detecting an angle based on a reference angle. Here, the reference angle is a predetermined angle corresponding to an origin (absolute value) serving as a reference when the angle is calculated.

As an angle detection method, an incremental method (INC method) and an absolute method (ABS method) are known.

In the INC method, for example, an incremental pattern (INC pattern) with a constant pitch provided on a scale is continuously detected, and the number of the INC patterns that have passed through is counted up or counted down, whereby a displacement of an angle in a measurement target is detected.

In the ABS method, for example, a reference angle serving as an origin is specified by a predetermined method, and the absolute value of the displacement of the angle in the measurement target is detected by combining the angle detected by the INC method and the reference angle. In another ABS method, the absolute value of the displacement of the angle in the measurement target is detected by detecting an absolute pattern (ABS pattern) randomly provided on a scale and analyzing the ABS pattern, for example.

For example, an optical rotary encoder described in Japanese Patent Application Laid-Open No. Hei 6-11362 includes a rotary slit plate (scale), a fixed slit plate, a plurality of LEDs, and a plurality of light receiving elements. The rotary slit plate includes slits for A phase signal and slits for B phase signal, which are angle detection slits for calculating an angle by the INC method, slits for C phase signal, which are slits for detecting a rotor magnetic pole position, and slits for Z phase signal, which are slits for detecting a predetermined rotation angle, that is, a reference angle (origin) during one rotation of the optical axis of the optical rotary encoder. The optical rotary encoder can calculate a high-resolution angle based on signals detected from the slits for the A-phase signal and the slits for the B-phase signal, and can calculate an angle corresponding to the circumferential length of the rotating slit plate. Further, the reference angle can be specified based on the signal detected from the slits for the Z-phase signal. The optical rotary encoder can detect the absolute value of the displacement of the angle in the measurement object by combining the reference angle and the signal detected from the slits for the A-phase signal and the slits for the B-phase signal.

In addition, for example, the rotation angle detection device described in Japanese Patent Laid-Open No. 2017-133892 includes a measurement light receiving element that measures an angle. In the rotation angle detection device, collimated light flux generated by collimating divergent laser light irradiated from a single wavelength laser light source (light source) is incident on a reflection unit (reflection means) mounted on an object to be measured (measurement object), and the measurement light flux reflected from the reflection unit is converged by an objective lens. The measurement light receiving element is disposed such that the center of the light spot obtained by converging the measurement light flux is located on the boundary between the sensitive band and the non-sensitive band of the measurement light receiving element, and is mounted on the positioning stage. The rotation angle detection device controls the position of the measurement light receiving element by the positioning stage so that the center of the light spot continues to be positioned on the boundary between the sensitive band and the non-sensitive band of the measurement light receiving element when the measurement object rotates, and obtains the rotation angle of the measurement object based on the information of the position control. The rotation angle detection device can measure an angle with high resolution without using a scale based on a reference angle defined by a boundary between the sensitive band and the non-sensitive band of the measurement light receiving element.

In addition, for example, the shape measuring apparatus described in Japanese Patent Laid-Open No. 2005-274429 includes a measurement head unit that moves substantially in parallel relative to the surface to be measured (reflection means), and a signal processing unit (calculation means) that measures an amount by which the shape of the surface to be measured at the opposing position of the measurement head unit changes with the parallel movement between the measurement head unit and the surface to be measured. The measurement head section includes irradiation light forming means (light source) for irradiating light composed of multiple light fluxes of the same phase toward the surface to be measured, interference fringe forming means for diffracting reflected light from the surface to be measured to form interference fringes, and a light receiving element array (light receiving means) for receiving light of the interference fringes and outputting a light receiving signal. The signal processing unit detects a shape change of the surface to be measured from the displacement of the interference fringes based on the light receiving signal from the light receiving element array. As a result, the shape measuring apparatus can detect a wide range of angles, and can perform angle measurement with high resolution without using a scale.

SUMMARY OF THE INVENTION

Problems to be Solved by the Invention

However, the optical rotary encoder described in Japanese Patent Laid-Open No. 6-11362 requires a rotary slit plate which is a disk-shaped scale in order to obtain a reference angle. As a result, the optical rotary encoder has a problem that manufacturing of the rotary slit plate is costly and misalignment may occur when the rotary slit plate is attached to the output shaft of the servo motor. Further, the rotation angle detection apparatus disclosed in Japanese Patent Laid-Open No. 2017-133892 has a problem that the rotation angle of the object to be measured is allowed to be within 1 degree, and the range of detection is very narrow. Furthermore, the shape measuring apparatus disclosed in Japanese Patent Laid-Open No. 2005-274429 has a problem that it cannot detect the reference angle with respect to a surface to be measured.

It is an object of the present invention to provide an optical angle sensor capable of detecting a wide range of angles with high resolution, having no scale, and specifying the reference angle.

Means for Solving the Problems

The optical angle sensor of the present invention includes a light source for irradiating light, a reflection means for rotating around a predetermined axis as a measurement axis and reflecting light irradiated from the light source, a light receiving means for receiving light irradiated from the light source, and a calculation means for calculating light received by the light receiving means as a signal. In this optical angle sensor, the light receiving means receives the light irradiated from the light source through the reflection means, and the calculation means includes a specifying means for specifying the reference angle based on the light received by the light receiving means, and an angle calculating unit for calculating the absolute angle based on the light received by the light receiving means and the reference angle specified by the specifying means.

According to the present invention, the optical angle sensor can specify the reference angle by the specifying means, and can calculate the absolute angle based on the light received by the light receiving means and the reference angle specified by the specifying means. Therefore, the optical angle sensor can detect angles with high resolution, can detect a wide range of angles, has no scale, can specify the reference angle, and can detect an absolute angle.

In this case, it is preferable that a diffraction grating for diffracting the light irradiated from the light source is provided, and the light receiving means receives the light through the reflection means and the diffraction grating.

Here, the light irradiated from the light source through the diffraction grating becomes diffracted light, is reflected by the reflection means, and is irradiated to the light receiving means while generating interference fringes. The interference fringes irradiated to the light receiving means move on the light receiving means along the orthogonal direction orthogonal to the measurement axis on the light receiving surface of the light receiving means by the rotation of the reflection means. The light receiving means specifies the reference angle based on the movement of the interference fringes.

Therefore, according to such a configuration, since the light receiving means specifies the reference angle based on the light passing through the reflection means and the diffraction grating, the specifying means in the calculation means can specify the reference angle with high accuracy as compared with the case where the reference angle is specified based on the light passing through the reflection means alone.

In this case, it is preferable that the light receiving means includes a plurality of light receiving elements for receiving light and converting the light into a signal, and a plurality of light receiving units including the plurality of light receiving elements and arranged in parallel along an orthogonal direction orthogonal to the measurement axis on the light receiving surface of the light receiving means. The plurality of light receiving units may include a predetermined light receiving element as a first light receiving unit, and may include other light receiving elements different from the first light receiving unit as a second light receiving unit. The specifying means may include a signal detecting unit for detecting a signal from each of the first light receiving unit and the second light receiving unit, and a reference angle determining unit for determining the reference angle based on the signal detected by the signal detecting unit. When the reference angle determining unit determines that the signal detecting unit has detected a predetermined signal from each of the first light receiving unit and the second light receiving unit, the reference angle determining unit may specify the position at which the signal is detected as the reference angle.

According to such a configuration, the light receiving means includes the first light receiving unit and the second light receiving unit, and the reference angle determining unit can specify the position at which the signal is detected as the reference angle when it is determined that the signal detecting unit has detected the predetermined signal from each of the first light receiving unit and the second light receiving unit. Therefore, the optical angle sensor can detect angles with high resolution, can detect a wide range of angles, has no scale, can specify the reference angle, and can detect an absolute angle.

In this case, when the reference angle determining unit determines that the signal detecting unit has detected signals having the same intensity from the first light receiving unit and the second light receiving unit, it is preferable that the reference angle determining unit specifies the position at which the signal is detected as the reference angle.

Here, for example, the case where the signal detecting unit detects signals having the same intensity from the first light receiving unit and the second light receiving unit is the case where light is irradiated to the boundary between the first light receiving unit and the second light receiving unit. Therefore, according to such a configuration, when the reference angle determining unit determines that the signal detecting unit has detected signals of the same intensity from the first light receiving unit and the second light receiving unit, the position at which the signal is detected is specified as the reference angle. Consequently, the optical angle sensor can easily specify the reference angle by the reference angle determining unit.

The light receiving means may include a plurality of light receiving elements for receiving light and converting the light into a signal, and a plurality of light receiving units including the plurality of light receiving elements and arranged in parallel along an orthogonal direction orthogonal to the measurement axis on the light receiving surface of the light receiving means. It is preferable that the plurality of light receiving units include a predetermined light receiving element as a first light receiving unit, another light receiving element different from the first light receiving unit as a second light receiving unit, another light receiving element different from the first light receiving unit and the second light receiving unit as a third light receiving unit. The first light receiving unit and the third light receiving unit may be disposed adjacent to each other, and the second light receiving unit and the third light receiving unit may be disposed adjacent to each other. The calculation means may include an angle signal detecting unit that detects a signal for calculating an angle based on the signal converted by the plurality of light receiving elements. The specifying means may include: a signal detecting unit for detecting a signal from each of the first light receiving unit, the second light receiving unit, and the third light receiving unit; a reference signal output unit for outputting a first reference signal when a predetermined signal is detected from each of the first light receiving unit and the third light receiving unit, and outputting a second reference signal when a predetermined signal is detected from each of the second light receiving unit and the third light receiving unit, based on the signal detected by the signal detecting unit; and a reference angle calculating unit for specifying the reference angle by calculation based on a signal detected by the angle signal detecting unit from the output of one of the first reference signal and the second reference signal to the output of the other reference signal. The angle calculating unit may calculate the absolute angle based on the signal detected by the angle signal detecting unit and the reference angle calculated by the reference angle calculating unit.

According to such a configuration, the light receiving means includes a first light receiving unit, a second light receiving unit, and a third light receiving unit. Then, the reference angle calculating unit in the specifying means can specify the reference angle by calculation from the signal for calculating the angle detected by the angle signal detecting unit from the output of one of the first reference signal and the second reference signal to the output of the other reference signal, based on the first reference signal and the second reference signal output by the reference signal output unit. Therefore, the optical angle sensor can specify the reference angle with high accuracy as compared with the case of specifying the reference angle without performing calculation.

In this case, when the angle signal detecting unit detects a periodic signal, the third light receiving unit preferably includes a light receiving element such that a signal detected by the angle signal detecting unit between the first reference signal and the second reference signal outputting from the reference signal output unit is within one cycle.

According to such a configuration, when the angle signal detecting unit detects a periodic signal, the third light receiving unit includes a light receiving element such that the signal detected by the angle signal detecting unit between the output of the first reference signal and the output of the second reference signal from the reference signal output unit is within one cycle, so that the reference angle calculating unit in the specifying means can reliably specify the reference angle.

At this time, it is preferable that the reference signal output unit outputs the first reference signal when signals having the same intensity are detected from each of the first light receiving unit and the third light receiving unit, and outputs the second reference signal when signals having the same intensity are detected from each of the second light receiving unit and the third light receiving unit, based on the signal detected by the signal detecting unit.

Here, for example, the case where signals having the same intensity are detected from each of the first light receiving unit and the third light receiving unit based on the signal detected by the signal detecting unit, the light is irradiated to the boundary between the first light receiving unit and the third light receiving unit. The detection of signals having the same intensity from each of the second light receiving unit and the third light receiving unit, the light is irradiated to the boundary between the second light receiving unit and the third light receiving unit. Therefore, according to such a configuration, the reference signal output unit outputs the first reference signal when signals having the same intensity are detected from each of the first light receiving unit and the third light receiving unit, and outputs the second reference signal when signals having the same intensity are detected from each of the second light receiving unit and the third light receiving unit, based on the signal detected by the signal detecting unit, so that the timing of outputting the first reference signal and the second reference signal can be easily measured.

At this time, it is preferable that the plurality of light receiving elements are arranged in line along the orthogonal direction.

According to such a configuration, since the plurality of light receiving elements in the light receiving unit are arranged in line along the orthogonal direction, for example, the light receiving unit can be easily manufactured by arranging PDAs (Photo Diode Array) in line along the orthogonal direction. Further, the plurality of light receiving elements are arranged in line along the orthogonal direction, so that a signal for calculating an angle can be read from the interference fringes irradiated on the light receiving means.

The plurality of light receiving elements may be arranged side by side in a measurement axis direction which is a direction parallel to the measurement axis on the light receiving surface of the light receiving means, may have a predetermined size in the orthogonal direction, and may be arranged along the orthogonal direction by a predetermined number. The light receiving element may include a plurality of mask gratings arranged in line at a predetermined pitch along the orthogonal direction on the light receiving surface.

Here, when PDAs as a plurality of light receiving elements are arranged in line along the orthogonal direction, it is necessary to reduce the size of the PDAs themselves in order to obtain a measurement result of high resolution.

However, according to such a configuration, since the light receiving element is provided with a plurality of mask gratings arranged side by side in the measurement axis direction and having a predetermined size in the orthogonal direction and arranged in line at a predetermined pitch along the orthogonal direction on the light receiving surface, even if the size of the PDA itself is not reduced, the region of the light receiving element between the mask grating and the mask grating acts like an individual PDA, and therefore, the optical angle sensor can obtain a measurement result of high resolution.

In this case, it is preferable that the first light receiving unit includes two or more light receiving elements arranged in line along the measurement axis direction, the second light receiving unit includes two or more other light receiving elements different from the first light receiving unit and arranged in line along the orthogonal direction of the first light receiving unit. The plurality of mask gratings are arranged in each of the two or more light receiving elements with a phase shift of 90 degrees from the other light receiving elements.

According to such a configuration, in each of the two or more light receiving elements of the first light receiving unit arranged in line along the measurement axis direction and the two or more light receiving elements of the second light receiving unit arranged in line along the orthogonal direction of the first light receiving unit, the plurality of mask gratings are arranged at positions shifted in phase by 90 degrees. When there are two light receiving elements, the calculation means can detect a two-phase signal from the two light receiving elements. The signal for calculating an angle can be detected from the two-phase signal. Thus, the optical angle sensor can calculate the absolute the angle based on the signal for calculating the angle and the reference angle specified by the specifying means.

In this case, it is preferable that the first light receiving unit includes a multiple of four light receiving elements arranged in line in the measurement axis direction, and the second light receiving unit includes another multiple of four light receiving elements different from the first light receiving unit and arranged in line along the orthogonal direction of the first light receiving unit.

According to such a configuration, for example, when four light receiving elements are provided, the calculation means can detect four-phase signals from the four light receiving elements. Since the signal for calculating the angle detected from the four-phase signal is more sensitive than the signal for detecting the angle detected from the two-phase signal, the optical angle sensor can acquire the angle with higher accuracy. In addition, since the first light receiving unit and the second light receiving unit each include the number of light receiving elements which is a multiple of 4, signals of each phase can be detected with good balance.

In this case, it is preferable that the number of the light receiving elements included in the first light receiving unit and the number of the light receiving elements included in the second light receiving unit are the same.

According to such a configuration, since the number of the light receiving elements included in the first light receiving unit and the number of the light receiving elements included in the second light receiving unit are the same, the computing means can obtain signals of the same intensity from the first light receiving unit and the second light receiving unit.

Preferably, the light receiving means includes a position specifying sensor for specifying the position of the light on the light receiving surface of the light receiving means, and the specifying means specifies the reference angle based on the signal from the position specifying sensor.

According to such a configuration, the specifying means can easily specify the reference angle based on the signal from the position specifying sensor without performing an operation.

DETAILED DESCRIPTION OF THE EMBODIMENTS

First Embodiment

Hereinafter, a first embodiment of the present disclosure will be described with FIGS. 1 to 5B.

Figure 1:
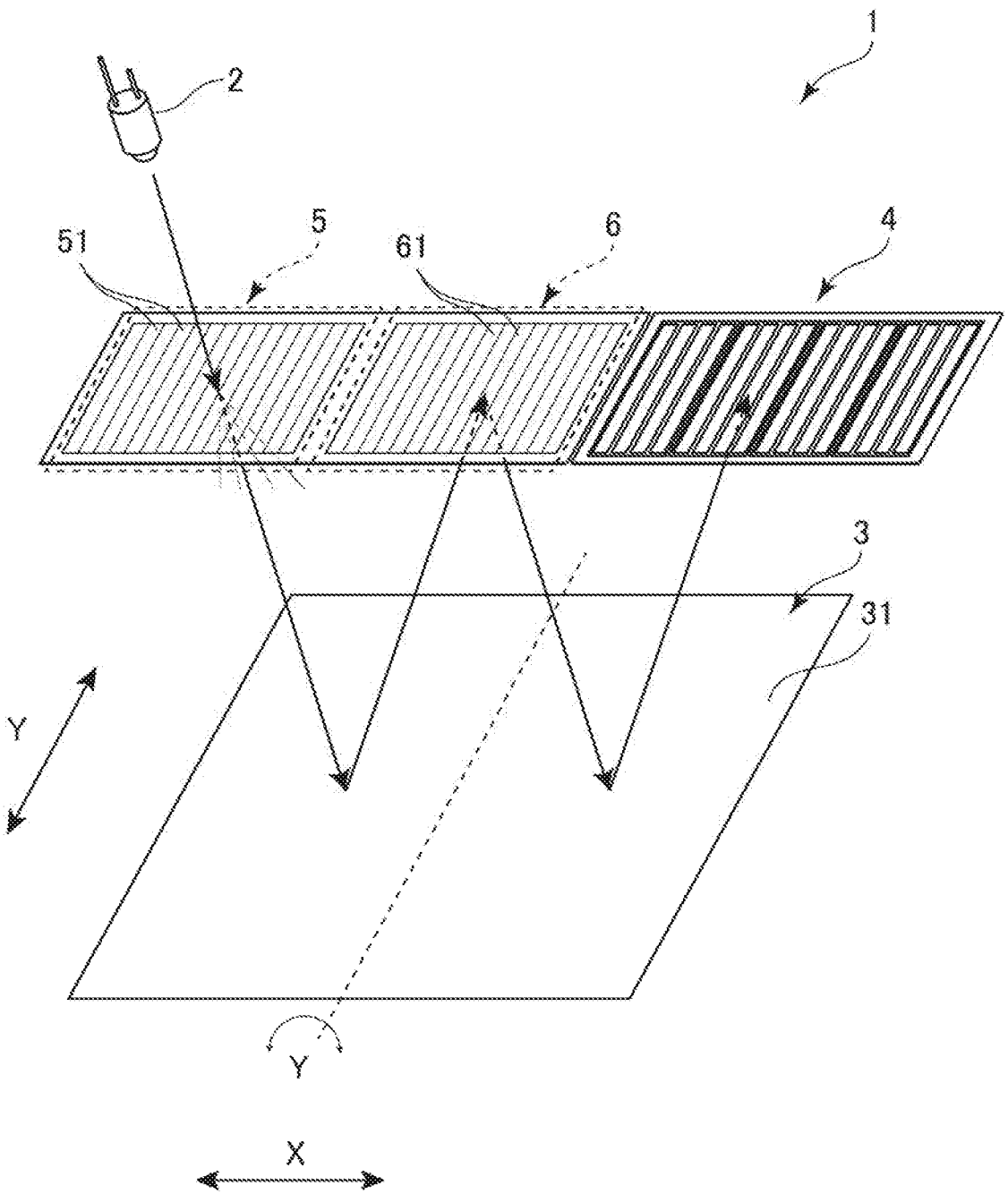
FIG. 1 is a perspective view showing an optical angle sensor according to the first embodiment.

FIG. 1 is a perspective view showing an optical angle sensor according to the first embodiment.

As shown in FIG. 1, the optical angle sensor 1 includes a light source 2 for irradiating light, a reflection means 3 for rotating around a predetermined axis as a measurement axis and reflecting light irradiated from the light source 2, a light receiving means 4 for receiving light irradiated from the light source 2, and diffraction gratings 5 and 6 for diffracting light irradiated from the light source 2. The diffraction gratings 5 and 6 include a first diffraction grating 5 having a plurality of gratings 51 arranged at a predetermined arrangement pitch, and a second diffraction grating 6 having a plurality of gratings 61 arranged at a predetermined arrangement pitch. The optical angle sensor 1 is provided inside a measuring instrument for measuring a rotating object.

The light source 2 irradiates parallel light having a constant width toward one surface of the first diffraction grating 5. The light source 2 is, for example, an LED (Light Emitting Diode). The light source 2 is not limited to an LED, and may be any light source.

The reflection means 3 is attached to a rotating measurement object. The reflection means 3 has a reflection surface 31 facing the light receiving means 4, the first diffraction grating 5, and the second diffraction grating 6. The reflection means 3 is provided so as to be rotatable by ±15 degrees from a reference angle (origin) around the measurement axis as the Y axis. In the following description, the measurement axis direction, which is a direction parallel to the measurement axis (Y-axis), may be the Y-direction, the direction orthogonal to the Y-axis in the reflection surface 31 of the reflection means 3 may be the X-axis, and the direction parallel to the X-axis may be the orthogonal direction.

Figure 2:
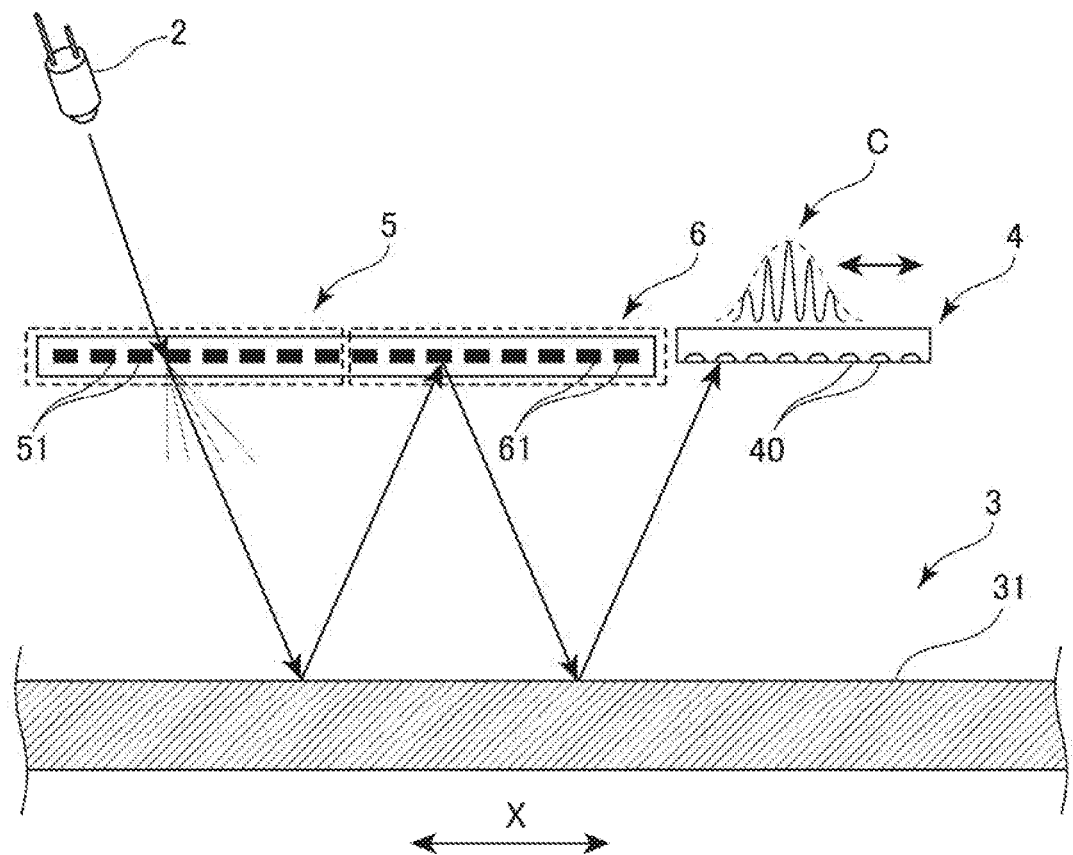
FIG. 2 is a cross-sectional view showing the optical angle sensor.

FIG. 2 is a cross-sectional view showing the optical angle sensor.

As shown in FIG. 2, the light source 2 and the reflection means 3 are disposed so as to face each other with the first diffraction grating 5 interposed therebetween. The reflection means 3, is disposed to face the second diffraction grating 6 and the light receiving means 4. The light receiving means 4 receives light from the light source 2 through the first diffraction grating 5, the second diffraction grating 6, and the reflection means 3, and receives the interference fringes C generated on the light receiving means 4 by the light.

The first diffraction grating 5 and the second diffraction grating 6 are formed of translucent glass. The first diffraction grating 5 and the second diffraction grating 6 are provided in one plate-like body formed in a long shape along the X direction. In this plate-like body, the light source 2 side is the first diffraction grating 5, and the light receiving means 4 side is the second diffraction grating 6. The first diffraction grating 5 and the second diffraction grating 6 are not limited to glass, and may be formed of any translucent member. Further, the first diffraction grating 5 and the second diffraction grating 6 may not be provided in one plate-like body, and the first diffraction grating 5 and the second diffraction grating 6 may be provided separately.

The parallel light irradiated to the first diffraction grating 5 by the light source 2 is diffracted by the first diffraction grating 5 and irradiated to the reflection means 3 as diffracted light, and is reflected by the reflection means 3 to become reflected light. The reflected light is further diffracted into a plurality of diffracted lights by the second diffraction grating 6. The plurality of diffracted lights diffracted by the second diffraction grating 6 are irradiated to the reflection means 3 again to become reflected lights, and are irradiated to the light receiving means 4. The reflected light passing through the first diffraction grating 5, the second diffraction grating 6, and the reflection means 3 interferes with each other at the light receiving means 4, thereby generating interference fringes C that repeat bright and dark at a cycle corresponding to the arrangement pitch of the plurality of gratings 51 and 61 along an orthogonal direction (X direction) orthogonal to the measurement axis on the light receiving surface of the light receiving means 4. In FIG. 2, for convenience of description, only the light irradiated from the light source 2 and reaching the light receiving means 4 is indicated by an arrow. In the following description, "phase" means a phase with respect to the period of the interference fringes C generated by the first diffraction grating 5 and the second diffraction grating 6, unless otherwise specified.

When the reflection means 3 rotates and the inclination angle changes, regarding the parallel light irradiated from the light source 2, the direction of the reflected light reflected to the second diffraction grating 6 changes. As a result, the arrival point of the parallel light irradiated from the light source 2 changes in the second diffraction grating 6 and the light receiving means 4. Since the optical distance from the first diffraction grating 5 to the light receiving means 4 is changed by changing the arrival point, the interference fringes C on the light receiving surface of the light receiving means 4 are displaced. That is, the interference fringes C irradiated to the light receiving means 4 move along the X direction, which is the orthogonal direction of the light receiving means 3, on the light receiving means 4 as indicated by the arrow in FIG. 2 (left-right direction in the drawing). The optical angle sensor 1 detects a change in the inclination angle of the reflection means 3 from the movement of the interference fringes C.

Figure 3:
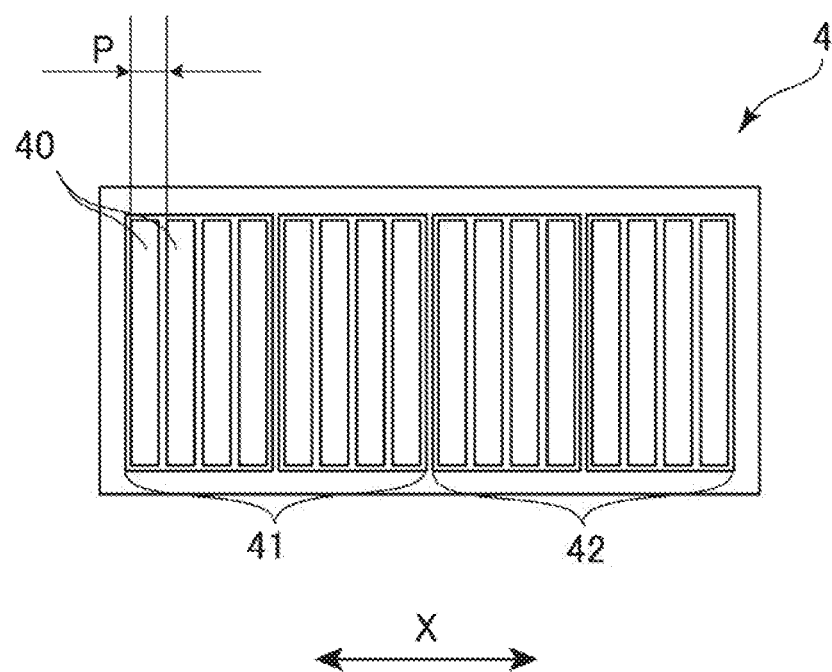
FIG. 3 is a diagram showing a light receiving means in the optical angle sensor.

FIG. 3 is a diagram showing a light receiving means in the optical angle sensor.

The light receiving means 4 has a light receiving surface wider than the width of the parallel light emitted from the light source 2, and includes a plurality of light receiving elements 40, as shown in FIG. 3. The plurality of light receiving elements 40 are arranged in line along an orthogonal direction (X direction), and receive light to convert the light into a signal. The plurality of light receiving elements 40 are arranged in line at an arrangement pitch P along the X direction corresponding to the arrangement pitch of the plurality of gratings 51 and 61 (see FIGS. 1 and 2). A PDA is used for the plurality of light receiving elements 40. The PDA is a photodetector having a property that a plurality of interference fringes C (see FIG. 2) can be measured at one time. The plurality of light receiving elements 40 are not limited to the PDA, and any light receiving device such as a PSD (Position Sensitive Detector) or a CCD (Charge-Coupled Device) may be used.

The light receiving means 4 includes a plurality of light receiving units that includes a plurality of light receiving elements 40 and arranged in line along an orthogonal direction (X direction). The plurality of light receiving units include a first light receiving unit 41 and a second light receiving unit 42.

The first light receiving unit 41 includes a predetermined light receiving element 40, and the second light receiving unit 42 includes another light receiving element 40 different from the first light receiving unit 41. The first light receiving unit 41 and the second light receiving unit 42 are arranged adjacent to each other.

The plurality of light receiving elements 40 are arranged in line along the X direction, which is the orthogonal direction, and are arranged at positions shifted in phase by 90 degrees from each other. The light receiving elements 40 included in the first light receiving unit 41 and the light receiving elements 40 included in the second light receiving unit 42 are arranged in the same number.

Figure 4:
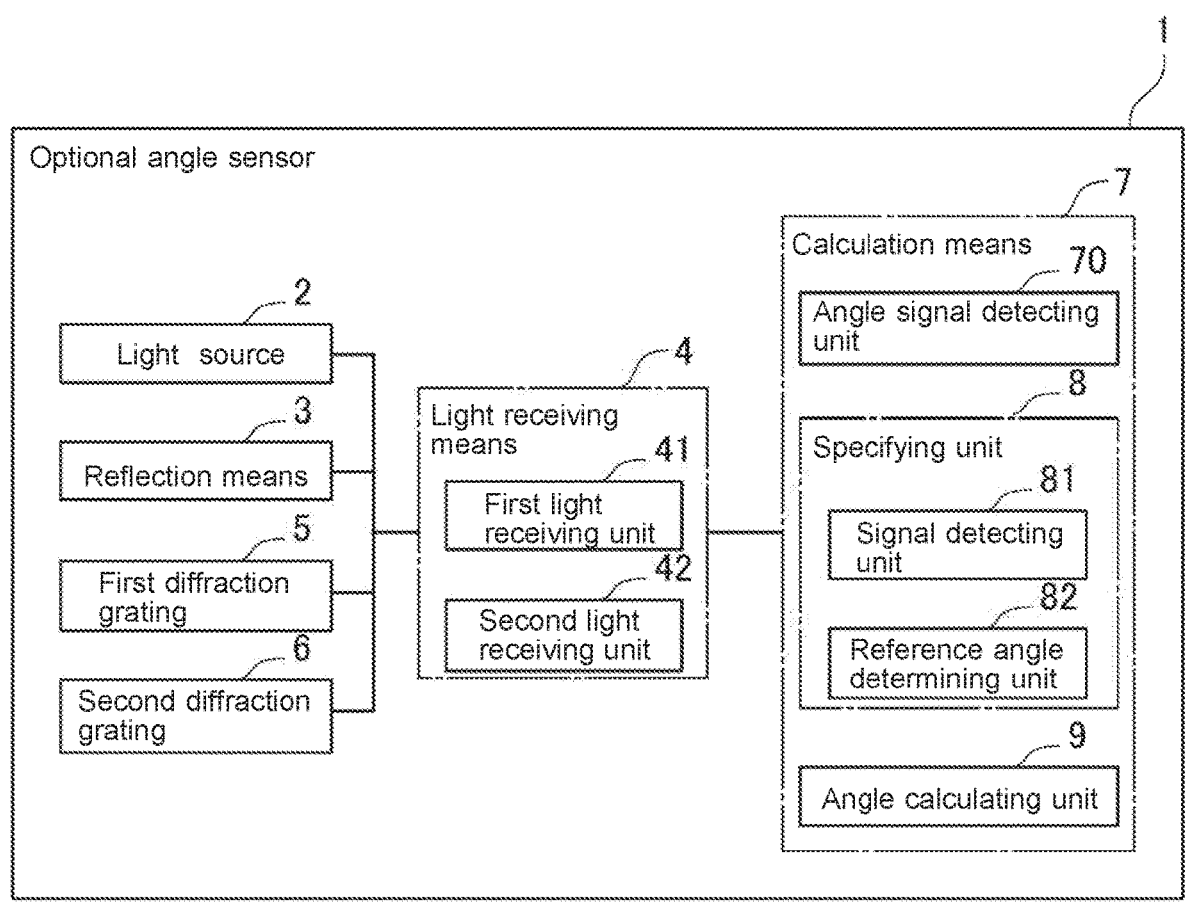
FIG. 4 is a block diagram showing a calculation means in the optical angle sensor.

FIG. 4 is a block diagram showing calculation means in the optical angle sensor.

As shown in FIG. 4, the optical angle sensor 1 further includes calculation means 7 for calculating the light received by the light receiving means 4 as a signal.

The calculation means 7 includes an angle signal detecting unit 70, a specifying unit 8, i.e., specifying means, for specifying the reference angle, and an angle calculating unit 9 for calculating an inclination angle of the reflection unit 3.

The angle signal detecting unit 70 detects a periodic signal for calculating an angle based on the light irradiated to the light receiving means 4 from the interference fringes.

The specifying unit 8 includes a signal detecting unit 81 and a reference angle determining unit 82, and specifies the reference angle based on the light received by the light receiving means 4.

The signal detecting unit 81 detects signals from the first light receiving unit 41 and the second light receiving unit 42.

The reference angle determining unit 82 determines the reference angle based on the signals detected by the signal detecting unit 81. When it is determined that the signal detecting unit 81 detects a predetermined signals from the first light receiving unit 41 and the second light receiving unit 42, the reference angle determining unit 82 specifies the position at which the signal is detected as the reference angle. In the present embodiment, the case where a predetermined signal is detected is a case where the signal detecting unit 81 detects signals having the same intensity from the first light receiving unit 41 and the second light receiving unit 42.

More specifically, the signals detected by the signal detecting unit 81 from the first light receiving unit 41 and the second light receiving unit 42 are signals based on the amount of light irradiated to the plurality of light receiving elements 40. The reference angle determining unit 82 determines where the light is irradiated in the first light receiving unit 41 and the second light receiving unit 42 from the signals based on the amount of the light irradiated to the light receiving means 4. Then, when light is irradiated to the light receiving elements 40 of both the first light receiving unit 41 and the second light receiving unit 42, and light is irradiated to the boundary between the first light receiving unit 41 and the second light receiving unit 42, that is, when light of the same amount of light is irradiated to the first light receiving unit 41 and the second light receiving unit 42, and signals of the same received light intensity are detected by the signal detecting unit 81, the reference angle determining unit 82 specifies the position as the reference angle.

Figure 5A:
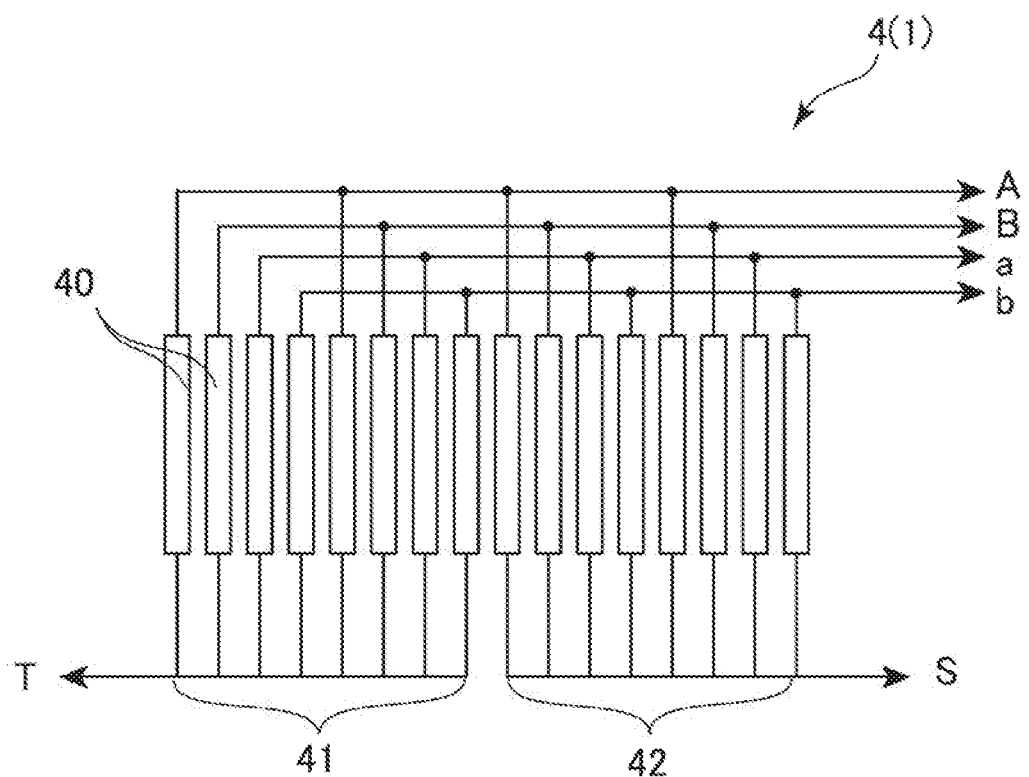
FIG. 5A is a diagram illustrating a method of specifying the reference angle in the optical angular sensor.
Figure 5B:
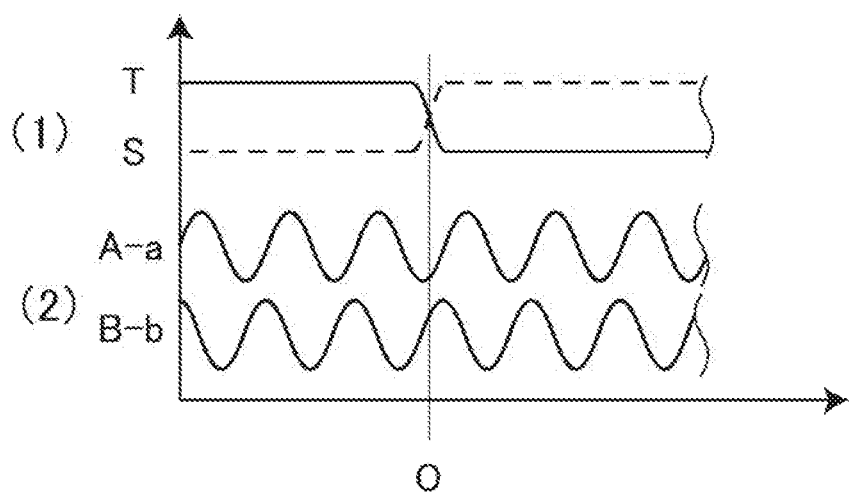
FIG. 5B is a diagram illustrating the method of specifying the reference angle in the optical angular sensor.

FIGS. 5A and 5B are diagrams showing methods for specifying the reference angle in the optical angle sensor.

Specifically, FIG. 5A is a schematic diagram of the light receiving means 4, and shows signals from the light receiving means 4 detected by the angle signal detecting unit 70 and the signal detecting unit 81. FIG. 5B is a diagram showing how the reference angle determining unit 82 specifies the reference angle based on a signal from the signal detecting unit 81. In the drawing 5B, (1) shows the received light strength of the light irradiated to the light receiving means 4 detected by the signal detecting unit 81, and (2) shows a signal for calculating the inclination angle of the reflection means 3 detected by the angle signal detecting unit 70. Hereinafter, methods for specifying the reference angle in the optical angle sensor 1 will be described based on the drawings 5A and 5B.

First, the measuring instrument provided with the optical angle sensor 1 performs an operation of inclining the reflection means 3 (see FIGS. 1 and 2) when the power is turned on. At this time, the measuring instrument inclines the reflection means 3 at full stroke. The optical angle sensor 1 irradiates parallel light for specifying the reference angle from the light source 2, together with the operation of inclining the reflection means 3 by the measuring instrument. As a result, light is irradiated to the light receiving means 4 in accordance with the inclination of the reflection means 3.

Next, the signal detecting unit 81 in the specifying means 8, i.e., specifying unit, detects a signal based on the light amount of the light irradiated through the reflection means 3.

As shown in the drawing 5A, the signal detecting unit 81 detects the first signal T when the first light receiving unit 41 is irradiated with light, and detects the second signal S when the second light receiving unit 42 is irradiated with light. The angle signal detecting unit 70 detects a signal for calculating the inclination angle of the reflection means 3 from the plurality of light receiving elements 40.

Here, the plurality of light receiving elements 40 are arranged so as to be shifted by ¼ period along the X direction. Therefore, the angle signal detecting unit 70 detects signals whose phases are shifted by ¼ period from the plurality of light receiving elements 40.

Specifically, for example, when detecting an A-phase signal from a predetermined light receiving element 40, the angle signal detecting unit 70 detects an a-phase signal having a phase shifted by 180 degrees from the light receiving element 40 having a phase shifted by ½ period from the light receiving element 40 detecting the A-phase signal. Further, the signal detecting unit 81 detects a B-phase signal whose phase is shifted by 90 degrees from the A-phase signal from the light receiving element 40 which is shifted by ¼ period from the light receiving element 40 which detects the A-phase signal, and detects a b-phase signal whose phase is shifted by 180 degrees from the light receiving element 40 which is shifted by ½ period from the light receiving element 40 which detects the B-phase signal. The A-phase signal, the a-phase signal, the B-phase signal, and the b-phase signal detected by the angle signal detecting unit 70 are used when the angle is calculated by the angle calculating unit 9 described later. It should be noted that it is arbitrary from which light receiving element 40 the angle signal detecting unit 70 detects the A-phase signal, and from which light receiving element 40 which signal is detected is a design matter.

Subsequently, the reference angle determining unit 82 determines, based on the first signal T and the second signal S, at which position on the light receiving surface of the light receiving means 4 the light reflected by the reflection means 3 is located.

The reflected light reflected by the reflection means 3 moves along the measurement axis direction (X direction) on the light receiving surface of the light receiving means 4 in accordance with the inclination of the reflection means 3. That is, the light reflected by the reflection means 3 moves on the light receiving surface of the first light receiving unit 41 and the second light receiving unit 42 in accordance with the inclination of the reflection means 3.

The vertical axis of the 5B in the drawing represents the received light strength of the light irradiated to the light receiving means 4, and the horizontal axis represents the inclination angles of the reflection means 3. As shown in (1) in the drawing 5B, the first signal T indicates a large received light intensity when the light is irradiated to the first light receiving unit 41, and the light receiving intensity gradually attenuates and fluctuates as the light travels to the second light receiving unit 42, and when the light is irradiated to the second light receiving unit 42, the light is not detected. When light is irradiated to the second light receiving unit 42, the second signal S indicates a large received light intensity, and the light receiving intensity gradually attenuates and fluctuates as the light travels to the first light receiving unit 41 and when the light is irradiated to the first light receiving unit 41, the light is not detected.

When the received light intensity of the first signal T and the second signal S fluctuates, the received light intensity of the first signal T and the received light intensity of the second signal S may become the same as shown at an intersection O in (1) of the drawing 5B. Accordingly, when it is determined that the received light intensity between the first signal T and the second signal S by the signal detecting unit 81 is the same received light intensity, the reference angle determining unit 82 specifies the position of the intersection point O as the reference angle. When the reference angle is specified, the optical angle sensor 1 stores the reference angle in a memory provided in advance, for example, and starts angle detection. Note that the reference angle does not have to be stored in the memory, and any method may be used as long as the optical angle sensor 1 can detect the angle based on the reference angle.

The angle calculating unit 9 calculates the inclination angle of the reflection means 3 based on the A-phase signal, the a-phase signal, the B-phase signal, and the b-phase signal detected by the angle signal detecting unit 70, and the reference angle, as shown in (2) in the drawing 5B. Specifically, the angle calculating unit 9 calculates a first measurement signal having an amplitude from the A-phase signal and the a-phase signal, calculates a second measurement signal having an amplitude whose phase is shifted from the first measurement signal from the B-phase signal and the b-phase signal, and calculates the inclination angle of the reflection means 3 from the first measurement signal and the second measurement signal by differential calculation. Since the angle calculating unit 9 calculates the inclination angle of the reflection means 3 by the differential calculation, the optical angle sensor 1 can perform angle detection with high accuracy as compared with the case where the angle is calculated without using the differential calculation.

According to this embodiment, the following functions and effects can be achieved.

(1) The optical angle sensor 1 can specify the reference angle by the specifying means 8, i.e., specifying unit, and can calculate the absolute angle by the angle calculating unit 9 based on the light received by the light receiving means 4 and the reference angle specified by the specifying means 8. Therefore, the optical angle sensor 1 is capable of detecting angles with high resolution, is capable of detecting a wide range of angles, has no scale, and is capable of specifying the reference angle and detecting absolute angles.

(2) Since the light receiving means 4 specifies the reference angle based on the light passing through the reflection means 3, the first diffraction grating 5, and the second diffraction grating 6, the specifying means 8, i.e., specifying unit, in the calculation means 7 can specify the reference angle with high accuracy as compared with the case of specifying the reference angle based on the light passing only through the reflection means 3, since the interference fringes C is used in the calculation.

(3) The light receiving means 4 includes the first light receiving unit 41 and the second light receiving unit 42. When it is determined that the signal detecting unit 81 detects predetermined signals from the first light receiving unit 41 and the second light receiving unit 42, the reference angle determining unit 82 can specify the position at which the signals are detected as the reference angle. Therefore, the optical angle sensor 1 can detect angles with high resolution, is capable of detecting a wide range of angles, has no scale, and is capable of specifying the reference angle and detecting absolute angles.

(4) When it is determined that the signal detecting unit 81 detects signals of the same intensity from the first light receiving unit 41 and the second light receiving unit 42, the reference angle determining unit 82 can easily specify the reference angle by the reference angle determining unit 82 in order to specify the position at which the signals are detected as the reference angle.

(5) Since the plurality of light receiving elements 40 in the light receiving means 4 are arranged in line along the X direction, the PDA can be easily manufactured by arranging the PDA in line along the X direction. Further, the plurality of light receiving elements 40 are arranged in line along the X direction, so that the signal for calculating an angle can be read from the interference fringes C irradiated to the light receiving means 4.

(6) Since the number of the light receiving elements 40 included in the first light receiving unit 41 and the number of the light receiving elements 40 included in the second light receiving unit 42 are the same, the computing means 7 can obtain signals of the same intensity from the first light receiving unit 41 and the second light receiving unit 42.

Second Embodiment

Hereinafter, a second embodiment of the present invention will be described with reference to FIGS. 6 to 8. In the following description, portions already described are denoted by the same reference numerals, and description thereof is omitted.

Figure 6:
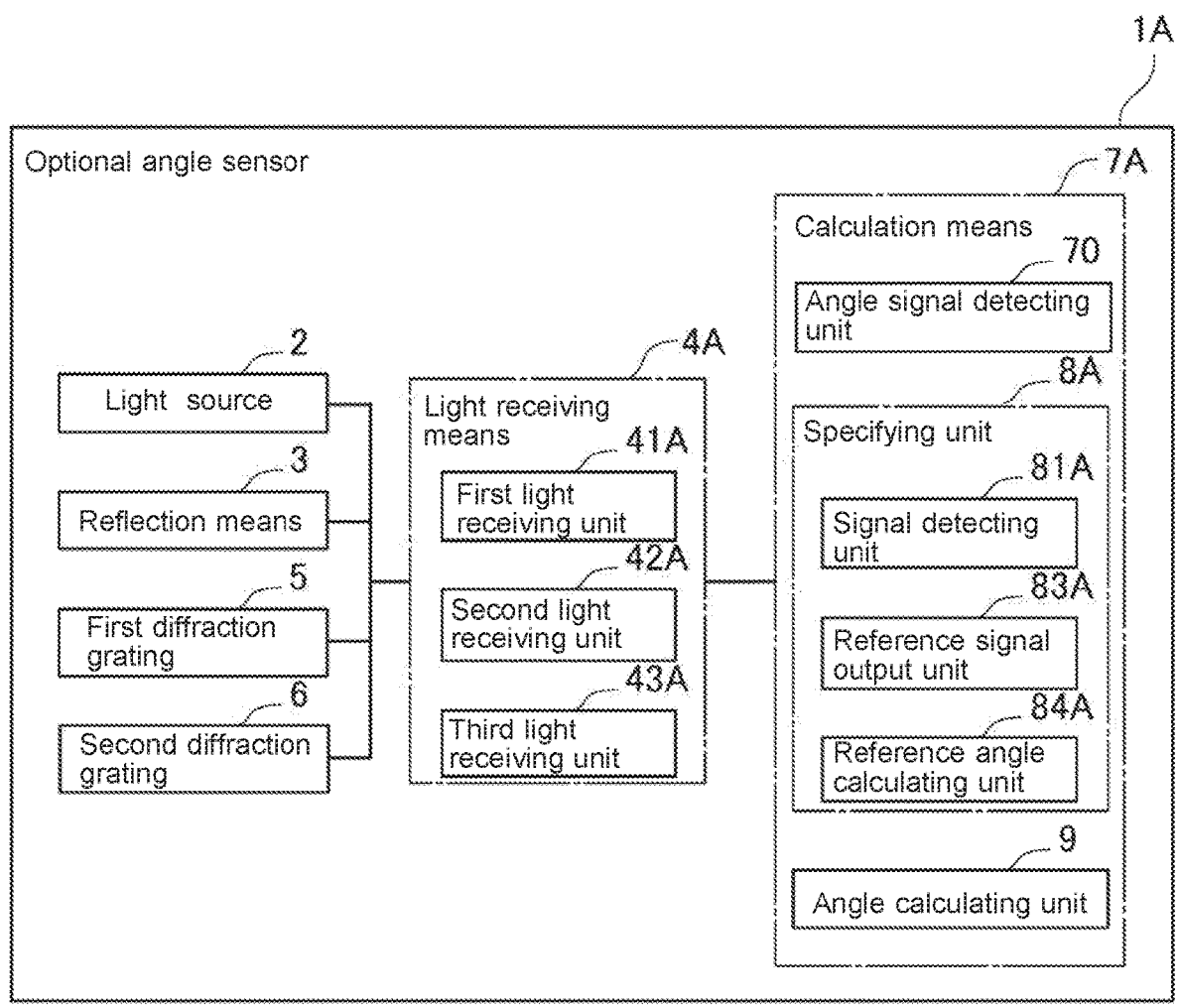
FIG. 6 is a block diagram showing an optical angle sensor according to the second embodiment.

FIG. 6 is a block diagram showing an optical angle sensor according to the second embodiment.

In the first embodiment, the light receiving means 4 includes a first light receiving unit 41 and a second light receiving unit 42.

In the present embodiment, as shown in FIG. 6, the light receiving means 4A in the optical angular sensor 1A differs from the first embodiment in that it includes a first light receiving unit 41A, a second light receiving unit 42A, and a third light receiving unit 43A as a plurality of light receiving units.

In the first embodiment, the specifying means 8, i.e., specifying unit, includes a reference angle determining unit 82.

The present embodiment differs from the first embodiment in that the specifying unit 8A in the calculation means 7A does not include the reference angle determining unit 82, and includes the reference signal output unit 83A and the reference angle calculating unit 84A.

The first light receiving unit 41A includes a predetermined light receiving element 40, and the second light receiving unit 42A includes another light receiving element 40 different from the first light receiving unit 41A. The third light receiving unit 43A consists of light receiving elements 40 between the first light receiving unit 41A and the second light receiving unit 42B, and includes other light receiving elements 40 different from the first light receiving unit 41A and the second light receiving unit 41B. The first light receiving unit 41A and the third light receiving unit 43A are provided adjacent to each other, and the second light receiving unit 42A and the third light receiving unit 43A are provided adjacent to each other.

The signal detecting unit 81A detects signals from the first light receiving unit 41A, the second light receiving unit 42A, and the third light receiving unit 43A. The reference signal output unit 83A detects a first reference signal, based on the signal detected by the signal detecting unit 81A, when predetermined signals from the first light receiving unit 41A and the third light receiving unit 43A are detected. The reference signal output unit 83A detects a second reference signal when predetermined signals from the second light receiving unit 42A and the third light receiving unit 43A are detected. In the present embodiment, the detection of the predetermined signal means the detection of signals having the same intensity from the first light receiving unit 41A and the third light receiving unit 43A, or the detection of signals having the same intensity from the second light receiving unit 42A and the third light receiving unit 43A, based on the signal detected by the signal detecting unit 81A.

When the first reference signal and the second reference signal are detected by the reference signal output unit 83A, the reference angle calculating unit 84A specifies the reference angle by calculation based on the signal for calculating the angle detected by the angle signal detecting unit 70 in a period from when one of the reference signals of the first reference signal and the second reference signal is detected to when the other reference signal is detected.

Figure 7A:
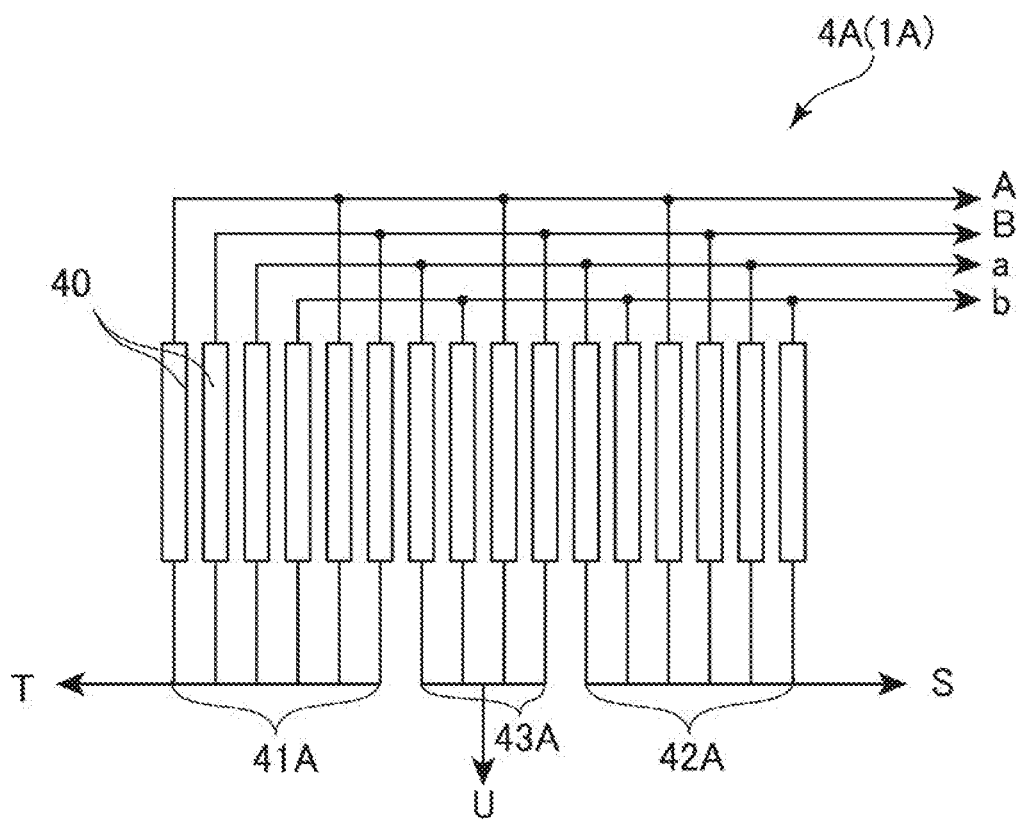
FIG. 7A is a schematic diagram of the light receiving means 4A.
Figure 7B:
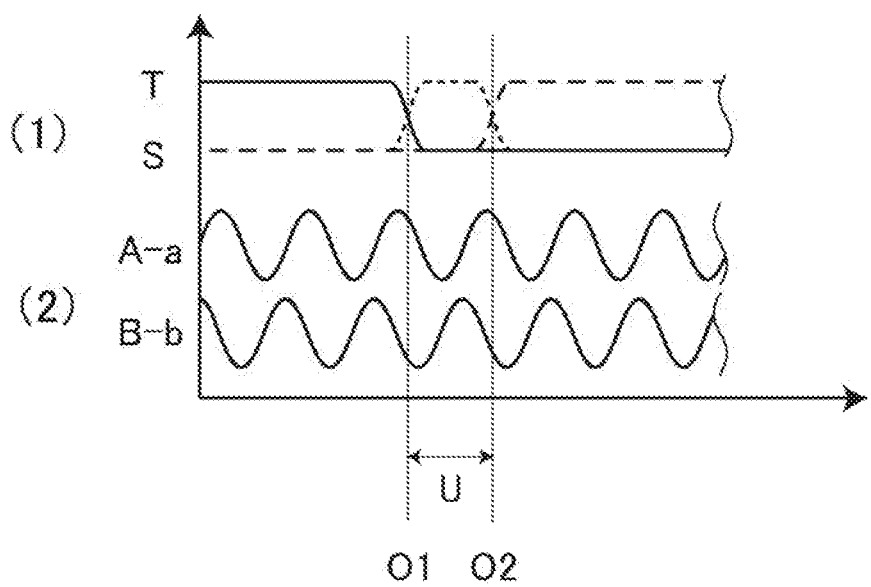
FIG. 7B is a diagram illustrating a method of identifying the reference angle in the optical angular sensor.

FIGS. 7A and 7B are diagrams illustrating method for specifying the reference angle in the optical angle sensor.

Specifically, FIG. 7A is a schematic diagram of the light receiving means 4A, and shows signals from the light receiving means 4A detected by the angle signal detecting unit 70 and the signal detecting unit 81A. FIG. 7B shows how the reference signal output unit 83A and the reference angle calculating unit 84A specify the reference angle based on the signals from the angle signal detecting unit 70 and the signal detecting unit 81A. (1) in FIG. 7B shows the received light strength of the light irradiated to the light receiving means 4A detected by the signal detecting unit 81A. (2) in FIG. 7B shows the signal for calculating the inclination angle of the reflection means 3 detected by the angle signal detecting unit 70. FIG. 8 is a flowchart showing a method of specifying a reference angle in the optical angle sensor.

Hereinafter, methods for specifying a reference angle in the optical angle sensor 1A will be described with reference to FIGS. 7A, 7B, and 8.

First, the measuring instrument provided with the optical angular sensor 1A performs an operation of inclining the reflection means 3 (see FIGS. 1 and 2) when the power is turned on. At this time, the measuring instrument inclines the reflection means 3 at full stroke. Then, the optical angle sensor 1A irradiates the collimated light for specifying the reference angle from the light source 2, together with the operation of inclining the reflection means 3 by the measuring instrument. As a result, the light is irradiated to the light receiving means 4A in accordance with the inclination of the reflection means 3.

Figure 8:
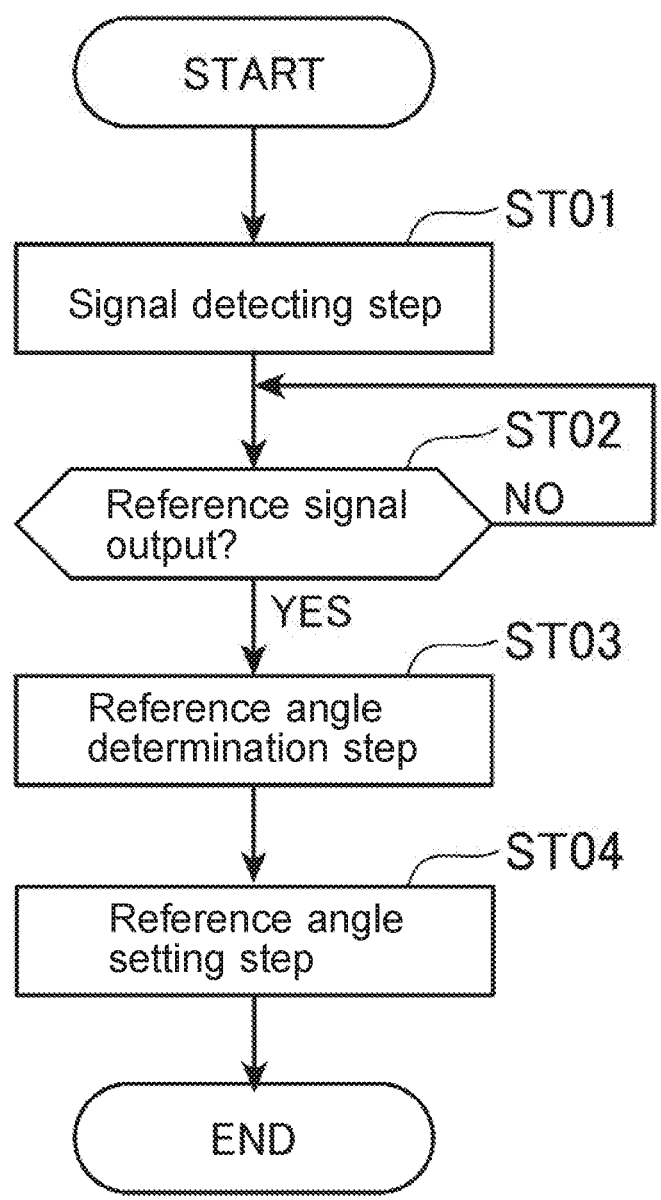
FIG. 8 is a flow chart illustrating the method of identifying the reference angle in the optical angle sensor.

Next, as shown in FIG. 8, the signal detecting unit 81A in the specifying unit 8A executes a signal detecting step for detecting signals based on the light amount of the light irradiated through the reflection means 3 (step ST01). As shown in the drawing 7A, the signal detecting unit 81A detects the first signal T when the first light receiving unit 41A is irradiated with light, detects the second signal S when the second light receiving unit 42 is irradiated with light, and detects the third signal U when the third light receiving unit 43A is irradiated with light. The angle signal detecting unit 70 detects the signal for calculating the inclination angle of the reflection means 3 from the plurality of light receiving elements 40.

Subsequently, the reference signal output unit 83A executes a reference signal determining step for determining whether or not light is irradiated to both the first light receiving unit 41A and the third light receiving unit 43A, and both the second light receiving unit 42A and the third light receiving unit 43A of the light receiving means 4A based on the first signal T, the second signal S, and the third signal U by the signal detecting unit 81 (step ST02).

The light reflected by the reflection means 3 moves along the measuring axial direction (X direction) on the light receiving surface of the light receiving means 4A in accordance with the inclination of the reflection means 3. That is, the light reflected by the reflection means 3 moves on the light receiving surfaces of the first light receiving unit 41A, the second light receiving unit 42A, and the third light receiving unit 43A in accordance with the inclination of the reflection means 3.

The vertical axis of FIG. 7B represents the received light intensity of the light irradiated to the light receiving means 4A, and the horizontal axis represents the angle indicating the inclination of the reflection means 3. At this time, as shown in (1) in the drawing 7B, the first signal T indicates a large received light intensity when the light is irradiated to the first light receiving unit 41A, and the light receiving intensity gradually attenuates and fluctuates as the light travels to the third light receiving unit 43A, and when the light is irradiated to the second light receiving unit 42A and the third light receiving unit 43A, the light is not detected. The second signal S indicates a large received light intensity when the light is irradiated to the second light receiving unit 42A, and the light receiving intensity gradually attenuates and fluctuates as the light travels to the third light receiving unit 43A, and when the light is irradiated to the first light receiving unit 41A and third light receiving unit 43A, the light is not detected. The third signal U indicates a large received light intensity when the light is irradiated to the third light receiving unit 43A, and the light receiving intensity gradually attenuates and fluctuates as the light travels to the first light receiving unit 41A or the second light receiving unit 42A, and when the light is irradiated to the first light receiving unit 41A or second light receiving unit 42A, the light is not detected.

When the received light intensity of the first signal T and the third signal U fluctuates, the received light intensity of the first signal T and the received light intensity of the third signal U may become the same as shown at the intersection O1 in (1) of the drawing 7B. When the reference signal output unit 83A determines that the received light intensity of the first signal T and the received light intensity of the third signal U by the signal detecting unit 81A are the same (step ST02), the reference signal output unit 83A outputs the intersection point O1 as the first reference signal O1. That is, the reference signal output unit 83A outputs the first reference signal O1 when light is irradiated to the boundary between the first light receiving unit 41A and the third light receiving unit 43A.

In addition, when the received light intensity of the second signal S and the third signal U fluctuates, the received light intensity of the second signal S and the third signal U may become the same as shown at the intersection O2 in (1) of the drawing 7B. When the reference signal output unit 83A determines that the received light intensity of the second signal S and the received light intensity of the third signal U are the same (step ST02), the reference signal output unit 83A outputs the intersection point O2 as the second reference signal O2. That is, the reference signal output unit 83A outputs the second reference signal O2 when light is irradiated to the boundary between the second light receiving unit 42A and the third light receiving unit 43A.

When both the first reference signal O1 and the second reference signal O2 are output by the reference signal output unit 83A (Yes in step ST02), the reference angle calculating unit 84A executes a reference angle determination step of determining the reference angle by calculation based on the signal for calculating the inclination angle of the reflection means 3 detected by the angle signal detecting unit 70 in a period from when in a period from when one of the first reference signal O1 and the second reference signal O2 is output to when the other reference signal is output as shown in (2) in the drawing 7B (step ST03).

At this time, the third light receiving unit 43A includes the light receiving element 40 so that the signal between the first reference signal O1 and the second reference signal O2 detected by the signal detecting unit 81A is within one cycle. The reference angle calculating unit 84A differentially calculates, for example, two sine wave signals which are a first measurement signal (A-phase signal—a-phase signal) and a second measurement signal (B-phase signal—b-phase signal) detected between the first reference signal O1 and the second reference signal O2. Then, the reference angle calculating unit 84A collates a predetermined angle determined in advance as the reference angle with the calculation result, and specifies the reference angle. Here, when one cycle or more of the two sine wave signals is included in the first reference signal O1 to the second reference signal O2, by differentially calculating the two sine wave signals, a predetermined value determined in advance as a predetermined reference angle may be calculated twice or more.

Therefore, in order to uniquely specify the reference angle and ensure that the same value as the reference angle is not calculated twice or more, the third light receiving unit 43A includes the light receiving element 40 so that the signal between the first reference signal O1 and the second reference signal O2 detected by the signal detecting unit 81A is within one cycle. Thereby, the reference angle calculating unit 84A can calculate and specify the reference angle by calculation without calculating duplicated reference angles by using the signal within one cycle.

When both the first reference signal O1 and the second reference signal O2 are not output by the reference signal output unit 83A (NO in step ST02), the reference signal determination process is performed until both the first reference signal O1 and the second reference signal O2 are output (step ST02). Here, the case in which the signals of both the first reference signal O1 and the second reference signal O2 are not output is the case in which only the first reference signal O1 or only the second reference signal O2 is output, or the case in which the signals of both the first reference signal O1 and the second reference signal O2 are not output.

When the reference angle is specified, the optical angle sensor 1A executes a reference angle setting step of storing and setting the reference angle in, for example, a memory provided in advance (step ST04), and starts detecting the angle.

The angle calculating unit 9 calculates the inclination angle of the reflection means 3 based on the A-phase signal, the a-phase signal, the B-phase signal, and the b-phase signal detected by the angle signal calculating unit 70, and the reference angle, as shown in (2) of the drawing 7B.

In this embodiment as well, the same functions and effects as those of (1) to (6) in the first embodiment can be obtained, and the following functions and effects can be obtained.

(7) Based on the first reference signal O1 and the second reference signal O2 output from the reference signal output unit 83A, the reference angle calculating unit 84A in the specifying unit 8A can specify the reference angle by calculation from the signal for calculating the angle detected by the angle signal detecting unit 70 in a period from when one of the reference signals of the first reference signal O1 and the second reference signal O2 is detected to when the other reference signal is detected. Therefore, the optical angle sensor 1A can specify the reference angle with high accuracy as compared with the case where the reference angle is specified without performing the calculation as in the first embodiment.

(8) Since the angle signal detecting unit 70 detects a periodic signal, the third light receiving unit 43A includes the light receiving elements 40 so that the signal detected by the angle signal detecting unit 70 between the first reference signal O1 and the second reference signal O2 output from the reference signal output unit 83A is within one cycle, so that the reference angle calculating unit 84A in the specifying unit 8A can reliably specify the reference angle.

(9) Since the reference signal output unit 83A outputs the first reference signal O1 when signals having the same intensity is detected from the first light receiving unit 41A and the third light receiving unit 43A, and outputs the second reference signal O2 when signals having the same intensity is detected from the second light receiving unit 42A and the third light receiving unit 43A, based on the signal detected by the signal detecting unit 81A, the timing of outputting the first reference signal O1 and the timing of outputting the second reference signal O2 can be easily measured.

Third Embodiment

Hereinafter, a third embodiment of the present invention will be described with reference to FIGS. 9A and 9B. In the following description, portions already described are denoted by the same reference numerals, and description thereof is omitted.

Figure 9A:
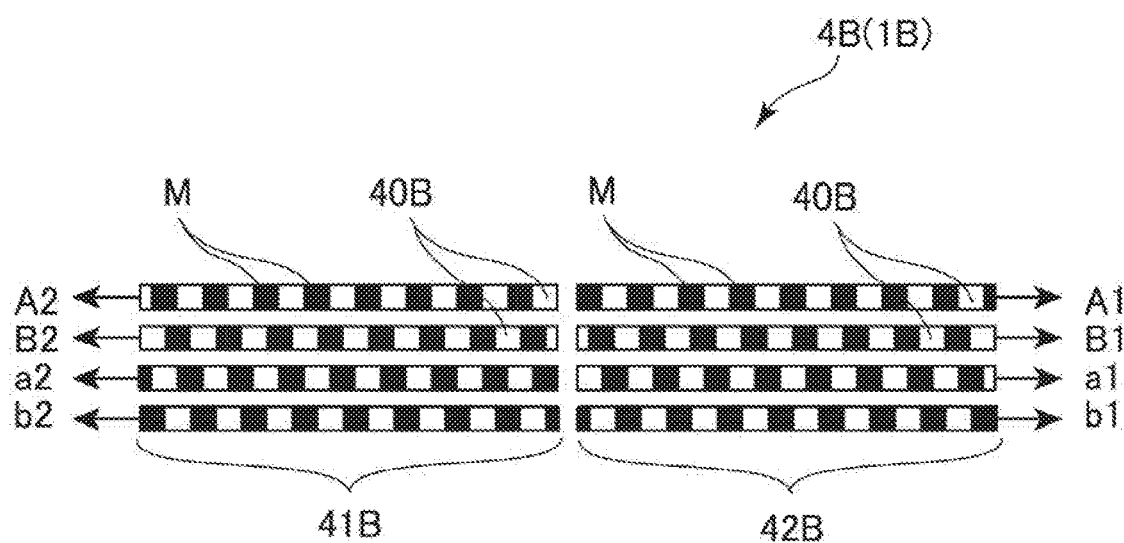
FIG. 9A is a schematic diagram of the light receiving means 4B.
Figure 9B:
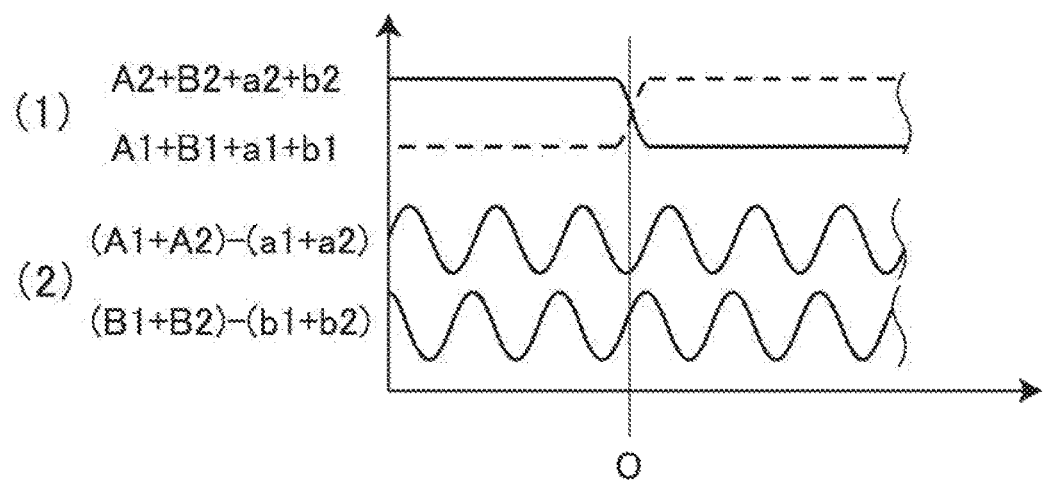
FIG. 9B shows a signal detected by the signal detector 81 from the light receiver 4B.

FIG. 9A and FIG. 9B are diagrams showing a light receiving means in the optical angular sensor according to the third embodiment.

Specifically, FIG. 9A is a schematic diagram of the light receiving means 4B. FIG. 9B shows signals detected by the signal detecting unit 81 from the light receiving means 4B.

In the first embodiment, the plurality of light receiving elements 40 are arranged in line along the orthogonal direction (X direction).

In the present embodiment, as shown in the drawing 9A, the plurality of light receiving elements 40B in the optical angular sensor 1B differs from the first embodiment in that they are arranged side by side along the measurement axis direction which is a direction parallel to the measurement axis on the light receiving surface of the light receiving means 4B, have a predetermined size in the orthogonal direction, are arranged in predetermined numbers along the orthogonal direction. The light receiving elements 40 B have a plurality of mask gratings M arranged in line along the orthogonal direction on the light receiving surface at predetermined pitches.

As shown in the drawing 9A, the first light receiving unit 41B includes four light receiving elements 40B that are two or more and are multiples of four arranged in line along the measuring axial direction. The second light receiving unit 42B includes four light receiving elements are two or more and are multiples of four. The second light receiving unit 42B differ from the first light receiving unit 41B and are arranged side by side in the perpendicular direction of the first light receiving unit 41B.

The plurality of mask gratings M are arranged in each of the four light receiving elements 40B so as to be shifted in phase by 90 degrees from the other light receiving elements 40B. By arranging the plurality of mask gratings M in this manner, each region of the light receiving element 40B between the mask gratings M can acquire signals and specify a reference angle in the same manner as the plurality of light receiving elements 40 in the first embodiment, in which the light receiving elements 40 are arranged in line along the measurement axis direction in the first embodiment.

Specifically, as shown in (1) in the drawing 9B, the optical angle sensor 1B identifies the intersection point O by calculating eight signals of the A1 phase signal, the a1 phase signal, the A2 phase signal, the a2 phase signal, the B1 phase signal, the b1 phase signal, the B2 phase signal, and the b2 phase signal detected by the angle signal detecting unit 70 (see FIG. 4), and identifies the intersection point O as the reference angle. In the optical angle sensor 1B, as shown in (2) in the drawing 9B, the angle of inclination of the reflection means 3 is calculated by the angle calculating unit 9 on the basis of the eight signals of the A1 phase signal, the a1 phase signal, the A2 phase signal, the a2 phase signal, the B1 phase signal, the b1 phase signal, the B2 phase signal, and the b2 phase signal detected by the angle signal detecting unit 70, and the reference angle.

The mask grating M functions in the same manner as the diffraction grating, and diffraction can be generated on the light receiving element 40B. Therefore, diffraction can be generated on the light receiving element 40B without requiring a space for providing a diffraction grating, so that space saving can be achieved. Further, by arranging the mask grating M on the light receiving element 40B, a light receiving element smaller than miniaturized light receiving element 40 can be formed on the light receiving element 40B in a pseudo manner, so that a signal with high resolution can be acquired and high accuracy can be achieved.

In this embodiment as well, the same functions and effects as those of (1) to (6) in the first embodiment can be obtained, and the following functions and effects can be obtained.

(10) The light receiving elements 40B are arranged side by side in the measurement axis direction (Y direction) and has a predetermined size in the orthogonal direction. The light receiving element s 40B includes a plurality of mask gratings M arranged in line at a predetermined pitch along the orthogonal direction on the light receiving surface. As a result, even if the size of the PDA itself is not reduced, the optical angle sensor 1B can calculate a high resolution angle because the area of the light receiving elements 40B between the mask gratings M acts in the same manner as the individual PDAs.

(11) The first light receiving unit 41B includes the light receiving elements 40B, the number of which is a multiple of four, arranged side by side in the measurement axis direction, and the second light receiving unit 42B includes the light receiving elements which is different from the first light receiving unit 41B and the number of which is another multiple of four arranged side by side in the orthogonal direction of the first light receiving unit 41B. Therefore, the calculation means 7 can detect the four-phase signals from the four light receiving elements 40B. The signal for calculating the angle detected from the four-phase signal is more sensitive than the signal for detecting the angle detected from the two-phase signal. Therefore, the optical angle sensor 1B can acquire an angle with higher accuracy. In addition, since the first light receiving unit 41B and the second light receiving unit 42B each include four light receiving elements 40B which are multiples of four, signals of respective phases can be detected with good balance.

Fourth Embodiment

Hereinafter, a fourth embodiment of the present invention will be described with reference to FIG. 10. In the following description, portions already described are denoted by the same reference numerals, and description thereof is omitted.

Figure 10:
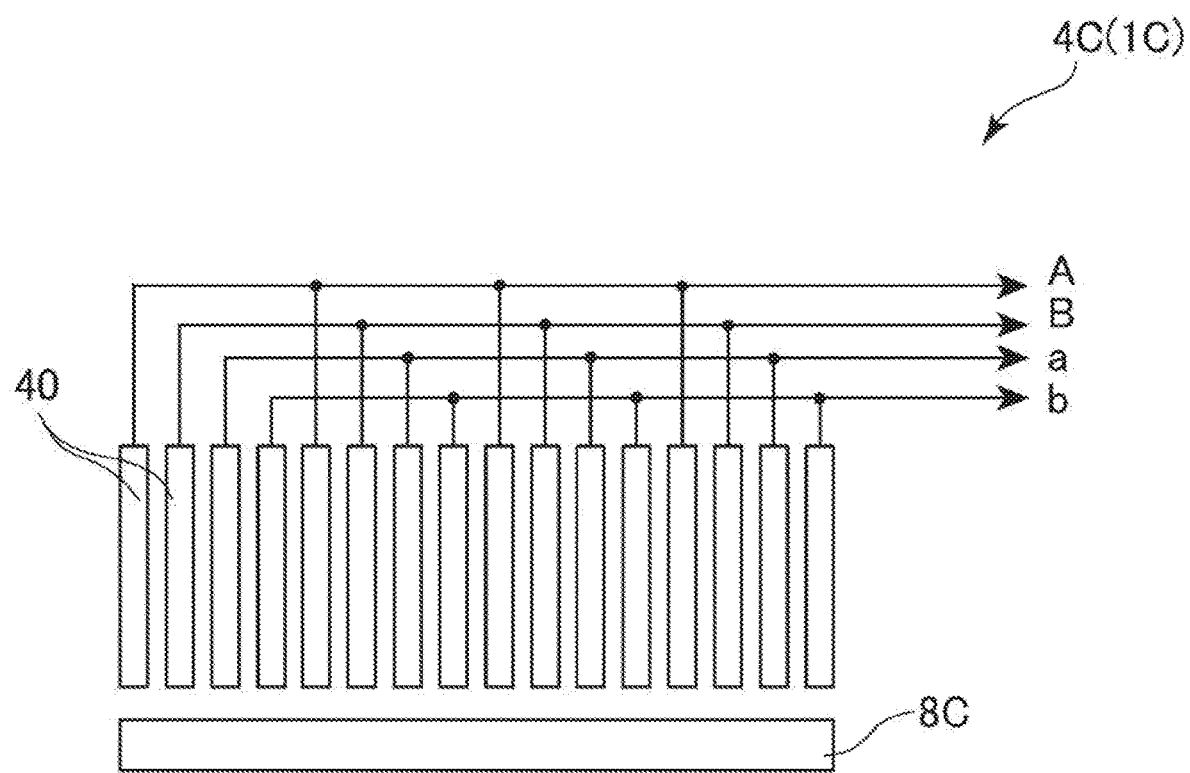
FIG. 10 is a diagram showing the light receiving means in the optical angle sensor according to the fourth embodiment.

FIG. 10 is a diagram showing light receiving means in the optical angle sensor according to the fourth embodiment.

In the first to third embodiments, the specifying unit 8, 8A, 8B specifies the reference angle based on the signal from the angle signal detecting unit 70 and the signal from the signal detecting units 81, 81A.

In the present embodiment, as shown in FIG. 10, the specifying means in the optical angle sensor 1C differs from the first embodiment to the third embodiment in that it includes a position specifying sensor 8C for specifying the position of light on the light receiving surface of the light receiving means 4C, and specifies a reference angle based on signals from the position specifying sensor 8C. The position specifying sensor 8C is, for example, a CCD, a CMOS, or a PSD, and specifies reference angles which are absolute positions from light spots irradiated on the light receiving surface of the light receiving unit 4C.

By using the position specifying sensor 8C, the specifying unit can specify the reference angles regardless of the calculation. Therefore, in the first to third embodiments, the measuring instrument provided with the optical angle sensor 1C for specifying the reference angle performs the operation of inclining the reflection means 3 (see FIGS. 1 and 2) when the power is turned on, but in the present embodiment, the reference angle can be specified without such an operation. Therefore, it is possible to efficiently specify the reference angles as compared with the specifying unit 8, 8A, and 8B of the other embodiment.

In this embodiment as well, the same functions and effects as those of (1) to (6) in the first embodiment can be obtained, and the following functions and effects can be obtained.

(12) The specifying unit can easily specify the reference angles based on the signals from the position specifying sensor 8C without performing an arithmetic operation.

MODIFICATIONS OF THE EMBODIMENTS

It should be noted that the present invention is not limited to the above-mentioned embodiments, and variations, improvements, and the like within a range in which the object of the present invention can be achieved are included in the present invention.

For example, in the embodiments described above, the optical angular sensors 1 and 1A-1C are provided in the measuring instrument, but they may be provided in other instruments instead of the measuring instrument, and there is no particular limitation on what is provided.

Figure 11:
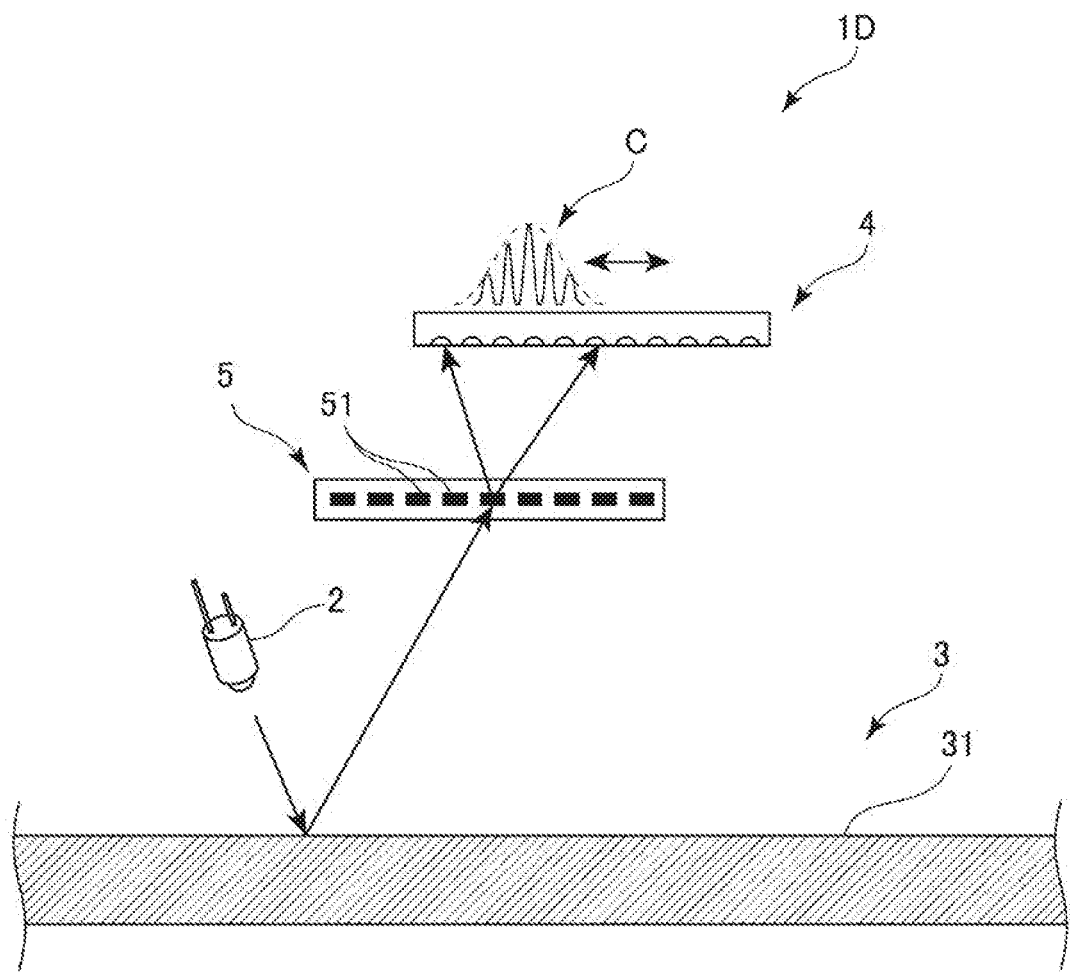
FIG. 11 is a cross-sectional view showing an optical angle sensor according to a first modification.

FIG. 11 is a cross-sectional view showing an optical angle sensor according to a first modification of the embodiments.

In the embodiments described above, the light of the light source 2 is irradiated to the first diffraction grating 5, and the reflection means 3 reflects the diffracted light through the first diffraction grating 5, but the reflection means 3 may reflect the light from the light source 2, and the first diffraction grating 5 may diffract the reflected light reflected by the reflection means 3, as in the optical angular sensor 1D shown in FIG. 11.

In the above embodiments, the first diffraction grating 5 and the second diffraction grating 6 are provided as diffraction gratings, but the optical angle sensor may include two or more diffraction gratings, or may include only one diffraction grating or may not include the diffraction gratings as shown in FIG. 11.

In short, the light receiving means receives the light irradiated from the light source via the reflection means, and the specifying means in the calculation means can specify the reference angle on the basis of the light received by the light receiving means, the path of the light irradiated to the light receiving means may be anything.

Figure 12:
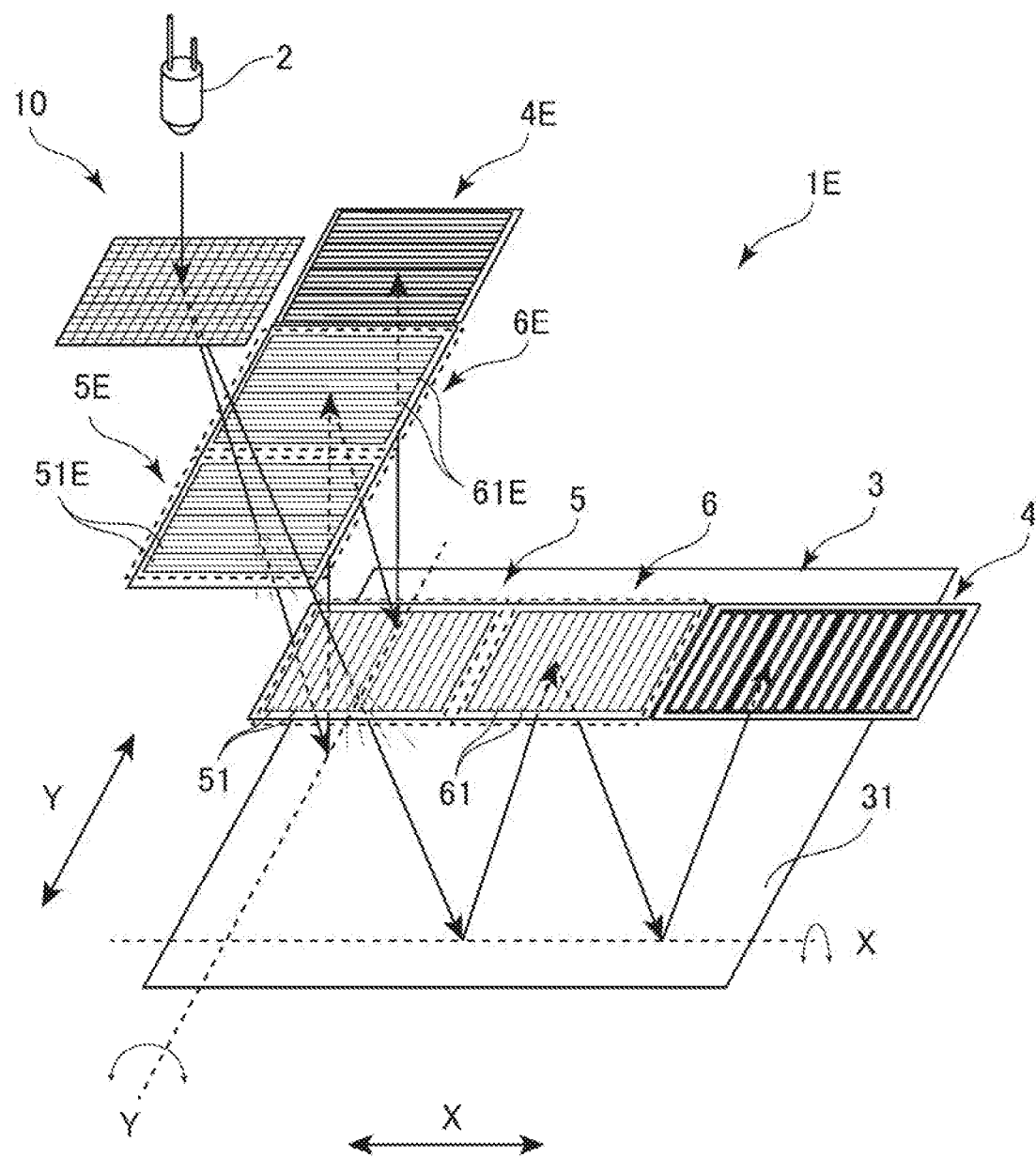
FIG. 12 is a perspective view showing an optical angle sensor according to a second modification.
Figure 13:
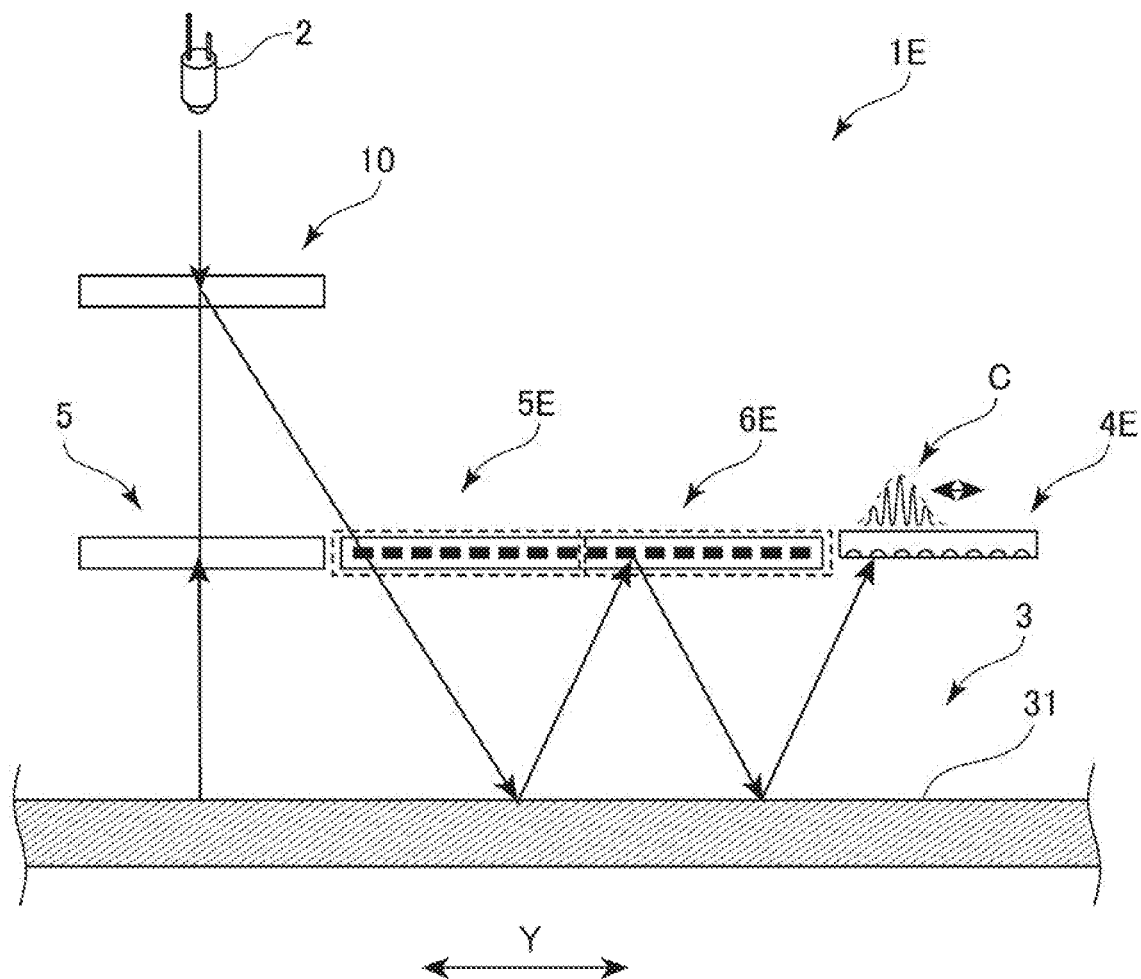
FIG. 13 is a cross-sectional view showing an optical angle sensor according to a second modification.

FIG. 12 is a perspective view showing an optical angle sensor according to a second modification. FIG. 13 is a cross-sectional view showing an optical angle sensor according to a second modification.

In the embodiments described above, the optical angle sensors 1 and 1A-1D have the Y-axis as the measurement axis, but as in the optical angle sensor 1E shown in FIG. 12, the X-axis as well as the Y-axis as the measurement axis may be used as the two-axis optical angle sensor.

In this instance, the optical angular sensor 1E includes a diffraction grating 10 that divides and diffracts the light emitted from the light source 2 into light in at least two directions. The present embodiment differs from the above-described embodiments in that it includes a third diffraction grating 5E having a plurality of gratings 51E arranged in line in a direction orthogonal to the X-axis which is the measurement axis, a fourth diffraction grating 6E having a plurality of gratings 61E arranged in line in a direction orthogonal to the X-axis which is the measurement axis, a light receiving means 4E which receives light passing through the third diffraction grating 5E and the fourth diffraction grating 6E and has a plurality of light receiving elements arranged in line in a direction orthogonal to the X-axis which is the measurement axis.

As shown in FIG. 13, the collimated light irradiated from the light source 2 is split by the diffraction grating 10 and diffracted toward the third diffraction grating 5E. The diffracted light diffracted in the X-direction by the third diffraction grating 5E is reflected by the reflection means 3, diffracted by the second diffraction grating 6E, reflected by the reflection means 3, and then received by the light receiving means 4E. As a result, the optical angle sensor 1E can use not only the Y-axis but also the X-axis as the measuring axis, so that a single optical angle sensor 1E can detect a plurality of angles in a plurality of axes.

In the above embodiments, the reflection means 3 is provided so as to be rotatable by ±15 degrees from the reference angle, but may not be ±15 degrees, and may be, for example, ±1 degree or ±180 degrees.

In the second embodiment, the third light receiving unit 43A of the light receiving means 4A includes the light receiving element 40 so that the signal detected by the angle signal detecting unit 70 is one cycle or less, but may include the light receiving element 40 so that the signal is one cycle or more.

In the first embodiment and the second embodiment, in the light receiving means 4 and 4A-4E, the number of light receiving elements 40 included in the first light receiving units 41 and 41A and the number of light receiving elements 40 included in the second light receiving units 42 and 42A are the same, but the same number of light receiving elements may not be included. In short, the number of light receiving elements included in the first light receiving unit and the second light receiving unit may be different from each other as long as the reference angle determining unit in the specifying means can specify the reference angle from the signal from the signal detecting unit and the reference signal output unit can detect the first reference signal and the second reference signal from the signal from the signal detecting unit.

In the second embodiment, the plurality of light receiving elements 40 in the first light receiving unit 41A, the second light receiving unit 42A, and the third light receiving unit 43A are arranged in parallel along the measurement axis direction, but may be a plurality of light receiving elements 40B having a plurality of mask gratings M as in the third embodiment. In short, the light receiving means may include a plurality of light receiving elements.

In the embodiments described above, the angle calculating unit 9 calculates the inclination angle of the reflection means 3 by the differential calculation based on the signal for calculating the angle detected by the angle signal detecting unit 70, but the angle calculating unit may calculate the inclination angle of the reflection means without using the differential calculation. In short, the angle calculating unit may calculate the angle by any method as long as the angle can be calculated based on the signal converted by the plurality of light receiving elements.

In the first embodiment, the first light receiving unit 41 and the second light receiving unit 42 are provided adjacent to each other, and in the second embodiment, the first light receiving unit 41A and the third light receiving unit 43A are provided adjacent to each other, and the second light receiving unit 42A and the third light receiving unit 3A are provided adjacent to each other, but a plurality of light receiving units may not be provided adjacent to each other.

Further, the reference angle determining unit 82 of the first embodiment specifies the position at which the signal is detected as the reference angle when the signal detecting unit 81 determines that the signal of the same intensity is detected from the first light receiving unit 41 and the second light receiving unit 42. Alternatively, the reference angle determining unit 82 may specify, as the reference angle, a position at which a signal is detected when the signal detecting unit determines that a different predetermined signal is detected from the first light receiving unit and the second light receiving unit. In short, when the reference angle determining unit determines that the signal detecting unit has detected a predetermined signal from the first light receiving unit and the second light receiving unit, the reference angle determining unit may specify the position at which the signal is detected as the reference angle.

In the second embodiment, the reference signal output unit 83A outputs the first reference signal when signals having the same intensity are detected from the first light receiving unit 41A and the third light receiving unit 43A, and outputs the second reference signal when signals having the same intensity are detected from the second light receiving unit 42A and the third light receiving unit 43A, based on the signal detected by the signal detecting unit 81A. Alternatively, the reference signal output unit 83A may output the first reference signal when a different predetermined signal is detected from the first light receiving unit and the third light receiving unit, and may output the second reference signal when a different predetermined signal is detected from the second light receiving unit and the third light receiving unit. In short, the reference signal output unit may output the first reference signal when a predetermined signal is detected from the first light receiving unit and the third light receiving unit based on the signal detected by the signal detecting unit, and may output the second reference signal when a predetermined signal is detected from the second light receiving unit and the third light receiving unit.

In the third embodiment, the first light receiving unit 41B includes four light receiving elements 40B arranged in parallel in the measurement axis direction, and the second light receiving unit 42B includes other four light receiving elements different from the first light receiving unit 41B and arranged in parallel in the orthogonal direction of the first light receiving unit 41B. Alternatively, the number of light receiving elements included in each of the first light receiving unit and the second light receiving unit may be two, or may be eight, which is a multiple of four, or may be two or more. For example, when each of the first light receiving unit and the second light receiving unit includes two light receiving elements, the optical angle sensor can detect a two-phase signal from the two light receiving elements. The optical angle sensor can calculate the absolute angle based on the signal for calculating the angle and the reference angle specified by the specifying means.

In short, the first light receiving unit may include two or more light receiving elements arranged side by side in the measurement axis direction, and the second light receiving unit may include two or more other light receiving elements different from the first light receiving unit and arranged side by side in the orthogonal direction of the first light receiving unit.

INDUSTRIAL APPLICABILITY

As described above, the present invention can be suitably applied to an optical angle sensor.

What is claimed is:
1. An optical angle sensor comprising:
a light source for irradiating light;

a reflection means for rotating around a predetermined axis as a measurement axis and reflecting light irradiated from the light source;
a light receiving means for receiving light irradiated from the light source;
a calculation means for calculating light received by the light receiving means as a signal; and
a diffraction grating for diffracting light emitted from the light source is provided,
wherein the light receiving means receives the light emitted from the light source and reflected by the reflection means and diffraction grating,
the calculation means includes:
a specifying means for specifying a reference angle on the basis of light received by the light receiving means; and
an angle calculating unit that calculates an absolute angle based on light received by the light receiving means and the reference angle specified by the specifying means.

2. The optical angle sensor as claimed in claim 1, wherein the light receiving means comprises:
a plurality of light receiving elements for receiving the light and converting the light into the signal; and
a plurality of light receiving units each including the plurality of light receiving elements and arranged in line along an orthogonal direction orthogonal to the measurement axis on a light receiving surface of the light receiving unit,
wherein the plurality of light receiving units includes:
a first light receiving unit which consist of predetermined light receiving elements; and
a second light receiving unit which consist of the other light receiving element different from the first light receiving unit,
wherein the specifying means includes:
a signal detecting unit for detecting the signal from the first light receiving unit and the second light receiving unit; and
a reference angle determining unit that determines the reference angle based on the signal detected by the signal detecting unit,
wherein the reference angle determining unit determines, when the signal detecting unit has detected predetermined signals from the first light receiving unit and the second light receiving unit, that the position at which the signals are detected as the reference angle.

3. The optical sensor according to claim 2, wherein the reference angle determining unit determines, when the signal detecting unit has detected the signals having the same intensity from the first light receiving unit and the second light receiving unit, that the position at which the signals are detected is the reference angle.

4. The optical angle sensor according to claim 2, wherein the plurality of light receiving elements are arranged in line along the orthogonal direction.

5. The optical angle sensor according to claim 2, wherein the plurality of light receiving elements are side by side along a measurement axis direction which is a direction parallel to the measurement axis on the light receiving surface of the light receiving means, has a predetermined size in the orthogonal direction, and is arranged along the orthogonal direction by a predetermined number,
and wherein light receiving element includes a plurality of mask gratings arranged in line at a predetermined pitch along the orthogonal direction on the light receiving surface.

6. The optical angle sensor according to claim 5, wherein the first light receiving unit includes two or more light receiving elements arranged side by side in the measurement axis direction, and the second light receiving unit includes two or more other light receiving elements different from the first light receiving unit and arranged side by side in a direction orthogonal to the first light receiving unit,
and wherein the plurality of mask gratings is arranged to be shifted in phase by 90 degrees from the other light receiving elements in each of the two or more light receiving elements.

7. The optical angle sensor according to claim 6, wherein the first light receiving unit includes the light receiving elements, the number of which is a multiple of four, arranged side by side in the measurement axis direction,
and wherein the second light receiving unit includes the light receiving elements, the number of which is a multiple of four, which are different from the first light receiving unit and arranged side by side in the orthogonal direction of the first light receiving unit.

8. The optical angle sensor according to claim 2, wherein a number of the light receiving element included in the first light receiving unit and a number of the light receiving element included in the second light receiving unit are the same.

9. The optical angle sensor according to claim 1, wherein the light receiving means comprising:
a plurality of light receiving elements for receiving the light and converting the light into a signal: and
a plurality of light receiving units each including the plurality of light receiving elements and arranged in line along an orthogonal direction orthogonal to the measurement axis on a light receiving surface of the light receiving unit,
wherein the plurality of light receiving units includes:
a first light receiving unit which consist of predetermined light receiving elements;
a second light receiving unit which consist of the other light receiving element different from the first light receiving unit;
a third light receiving unit which consist of the other light receiving element different from the first light receiving unit and the second light receiving unit,
wherein the first light receiving unit and the third light receiving unit are arranged adjacent to each other, and the second light receiving unit and the third light receiving unit are arranged adjacent to each other,
wherein the calculation means includes an angle signal detecting unit for detecting signals for calculating an angle based on the signal converted by the plurality of light receiving elements,
wherein the specifying means includes:
a signal detecting unit for detecting a signal from the first light receiving unit, the second light receiving unit, and the third light receiving unit;
a reference signal output unit that outputs a first reference signal when a predetermined signals are detected from the first light receiving unit and the third light receiving unit based on signals detected by the signal detecting unit, and outputs a second reference signal when a predetermined signals is detected from the second light receiving unit and the third light receiving unit; and
a reference angle calculating unit that specifies the reference angle by calculation based on signals detected by the angle signal detecting unit during a period from when one of the first reference signal and the second reference signal is output to when the other reference signal is output is provided is provided, when the first reference signal and the second reference signal are output from the reference signal output unit, and wherein the angle calculating unit calculates an absolute angle based on signals detected by the angle signal detecting unit and the reference angle calculated by the reference angle calculating unit.

10. The optical angle sensor according to claim 9, wherein the third light receiving unit the light receiving element so that the signal detected by the signal detecting unit between the first reference signal and the second reference signal is within one cycle, when the angle signal detector detects a periodic signal.

11. The optical angle sensor according to claim 9, wherein the reference signal output unit outputs the first reference signal when signals having the same intensity are detected from the first light receiving unit and the third light receiving unit based on the signal detected by the signal detecting unit, and output the second reference signal when signals having the same intensity are detected from the second light receiving unit and the third light receiving unit.

12. The optical angle sensor according to claim 1, wherein the light receiving means includes a position specifying sensor for specifying the position of the light on the light receiving surface of the light receiving means, and the specifying means determines the reference angle based on a signal from the position specifying sensor.

* * * * *